US010726376B2

(12) United States Patent
Joi et al.

(10) Patent No.: US 10,726,376 B2
(45) Date of Patent: Jul. 28, 2020

(54) MANAGER-EMPLOYEE COMMUNICATION

(71) Applicant: Workplace Dynamics, LLC, Exton, PA (US)

(72) Inventors: Richard Johnson Joi, Lancaster, PA (US); Anthony Douglas Moquin, Glenmoore, PA (US); Douglas J. Claffey, Malvern, PA (US); Mark Daniel Suwyn, Savannah, GA (US); John W. Quillen, Jr., Malvern, PA (US)

(73) Assignee: ENERGAGE, LLC, Exton, PA (US)

( * ) Notice: Subject to any disclaimer, the term of this patent is extended or adjusted under 35 U.S.C. 154(b) by 691 days.

(21) Appl. No.: 14/931,999

(22) Filed: Nov. 4, 2015

(65) Prior Publication Data

US 2016/0125349 A1 May 5, 2016

Related U.S. Application Data

(60) Provisional application No. 62/075,097, filed on Nov. 4, 2014, provisional application No. 62/210,493, filed on Aug. 27, 2015.

(51) Int. Cl.
| | | |
|---|---|---|
| *G06Q 10/00* | (2012.01) | |
| *G06Q 10/06* | (2012.01) | |
| *H04L 12/58* | (2006.01) | |
| *G06Q 10/10* | (2012.01) | |

(52) U.S. Cl.
CPC ....... *G06Q 10/06398* (2013.01); *G06Q 10/10* (2013.01); *H04L 51/08* (2013.01)

(58) Field of Classification Search
None
See application file for complete search history.

(56) References Cited

U.S. PATENT DOCUMENTS

| | | | | |
|---|---|---|---|---|
| 6,189,029 B1* | 2/2001 | Fuerst | ................... | G06Q 30/02 |
| | | | | 707/999.104 |
| 6,853,975 B1* | 2/2005 | Dirksen | ................ | G06Q 10/10 |
| | | | | 434/107 |
| 6,895,405 B1* | 5/2005 | Choi | ..................... | G06Q 30/02 |
| | | (Continued) | | |

FOREIGN PATENT DOCUMENTS

WO 2014011168 1/2015

OTHER PUBLICATIONS

An Oracle Best Practice Guide (Best Practices for Improving Survey Participation, Mar. 2012). (Year: 2012).*

(Continued)

*Primary Examiner* — Hafiz A Kassim
(74) *Attorney, Agent, or Firm* — Belles Katz LLC

(57) ABSTRACT

In one embodiment, the invention can be a method for manager-to-employee communication, the method including receiving comment data from employee devices of employees of an organization, the comment data indicating employee comments to a survey topic; receiving contact-me data from a manager device indicating contact-me requests, the contact-me requests indicating that the manager desires the employees to contact the manager directly regarding the employee comments to the survey topic; receiving contact-me response data from the employee devices indicating whether the employees will contact the manager directly; and generating a manager rating based on the saved contact-me response data.

13 Claims, 25 Drawing Sheets

(56) References Cited

U.S. PATENT DOCUMENTS

| | | | | |
|---|---|---|---|---|
| 7,383,200 | B1* | 6/2008 | Walker | G06Q 10/06311 705/7.15 |
| 7,392,197 | B1* | 6/2008 | Fliess | G06Q 10/10 705/319 |
| 7,552,063 | B1* | 6/2009 | McEachern | G06Q 30/02 705/3 |
| 7,720,737 | B2* | 5/2010 | D'Alessandro | G06Q 10/0639 705/12 |
| 8,332,232 | B2 | 12/2012 | Nickerson et al. | |
| 8,392,962 | B2* | 3/2013 | Grason | G06F 16/958 726/2 |
| 8,560,478 | B1* | 10/2013 | Despain | G06N 20/00 706/46 |
| 9,009,082 | B1* | 4/2015 | Marshall | G06Q 99/00 705/26.1 |
| 2002/0052774 | A1* | 5/2002 | Parker | G06Q 30/02 705/7.32 |
| 2002/0065709 | A1* | 5/2002 | MacKenzie | G06Q 10/0639 705/7.38 |
| 2002/0161611 | A1* | 10/2002 | Price | G06Q 30/02 705/346 |
| 2002/0188777 | A1* | 12/2002 | Kraft | H04M 3/22 710/100 |
| 2003/0061141 | A1* | 3/2003 | D'Alessandro | G06Q 40/00 705/36 R |
| 2003/0078804 | A1* | 4/2003 | Morrel-Samuels | G06Q 10/0639 705/7.42 |
| 2004/0215502 | A1* | 10/2004 | Takahashi | G06Q 10/0639 705/7.38 |
| 2004/0225577 | A1* | 11/2004 | Robinson | G06Q 30/02 705/14.1 |
| 2004/0267794 | A1* | 12/2004 | Might | G06Q 10/10 |
| 2005/0060219 | A1* | 3/2005 | Deitering | G06Q 10/06375 705/7.32 |
| 2005/0075922 | A1* | 4/2005 | Brady | G06Q 30/0203 705/7.32 |
| 2005/0076089 | A1 | 4/2005 | Fonseca | |
| 2005/0130110 | A1* | 6/2005 | Gosling | G09B 7/00 434/322 |
| 2006/0074708 | A1* | 4/2006 | Woods | G06Q 50/22 705/2 |
| 2006/0117318 | A1* | 6/2006 | Rumelhart | G06F 9/505 718/104 |
| 2006/0242154 | A1* | 10/2006 | Rawat | G06F 16/168 |
| 2007/0136237 | A1* | 6/2007 | Barker | G06F 21/6227 |
| 2007/0168247 | A1* | 7/2007 | Robbins | G06Q 10/00 705/7.32 |
| 2007/0174108 | A1* | 7/2007 | Monster | G06Q 30/0205 705/7.32 |
| 2007/0192163 | A1* | 8/2007 | Barr | G06Q 30/0203 705/7.32 |
| 2008/0015927 | A1 | 1/2008 | Ramirez | |
| 2008/0027783 | A1* | 1/2008 | Hughes | G06Q 10/00 705/7.14 |
| 2009/0024663 | A1 | 1/2009 | McGovern | |
| 2009/0254572 | A1 | 10/2009 | Redlich et al. | |
| 2009/0287642 | A1* | 11/2009 | Poteet | G06Q 30/02 |
| 2009/0327434 | A1* | 12/2009 | Reynolds | G06Q 30/02 709/206 |
| 2010/0023377 | A1* | 1/2010 | Sheridan | G06Q 10/10 705/7.32 |
| 2010/0058480 | A1* | 3/2010 | Hedberg | G16H 40/63 726/26 |
| 2010/0088156 | A1* | 4/2010 | Wilson | G06Q 30/02 705/7.32 |
| 2010/0145765 | A1* | 6/2010 | Kantarek | G06Q 30/02 705/7.32 |
| 2010/0169136 | A1 | 7/2010 | Kho et al. | |
| 2010/0211439 | A1* | 8/2010 | Marci | H04N 21/4532 705/7.29 |
| 2010/0262466 | A1* | 10/2010 | Smith | G06Q 10/00 705/7.36 |
| 2011/0010183 | A1* | 1/2011 | Manning | G06Q 30/02 705/1.1 |
| 2011/0010308 | A1 | 1/2011 | Primus et al. | |
| 2011/0010425 | A1 | 1/2011 | Bernatz | |
| 2011/0231226 | A1* | 9/2011 | Golden | G06Q 40/12 705/7.32 |
| 2011/0270650 | A1* | 11/2011 | Pavagadhi | G06Q 30/02 705/7.32 |
| 2012/0011006 | A1* | 1/2012 | Schultz | G06Q 30/0241 705/14.73 |
| 2012/0047000 | A1* | 2/2012 | O'Shea | G06Q 10/063 705/7.42 |
| 2013/0054497 | A1* | 2/2013 | Garland | G06Q 30/0201 706/12 |
| 2013/0198815 | A1* | 8/2013 | Piliouras | H04L 63/10 726/4 |
| 2013/0212693 | A1 | 8/2013 | Etchegoyen | |
| 2014/0017646 | A1 | 1/2014 | Seitzberg, III et al. | |
| 2014/0136617 | A1 | 5/2014 | Singer et al. | |
| 2014/0143025 | A1* | 5/2014 | Fish | G06Q 30/0282 705/7.42 |
| 2014/0222514 | A1* | 8/2014 | Huang | G06Q 30/0203 705/7.32 |
| 2014/0258421 | A1* | 9/2014 | Langhorst | H04L 51/28 709/206 |
| 2014/0278783 | A1* | 9/2014 | Du | G06Q 30/0203 705/7.32 |
| 2014/0364094 | A1* | 12/2014 | Blackwell | H04M 1/72583 455/414.1 |
| 2015/0095112 | A1* | 4/2015 | Micewicz | G06Q 50/12 705/7.32 |
| 2015/0120846 | A1* | 4/2015 | Volach | G06Q 30/02 709/206 |
| 2015/0134694 | A1* | 5/2015 | Burke | G06Q 10/00 707/769 |
| 2015/0220949 | A1* | 8/2015 | Pinsley | G06Q 30/0203 705/7.32 |

OTHER PUBLICATIONS

Alexis Arnold (an Organizational Assessment of Motivation and Performance in the Workplace, Spring 2008). (Year: 2008).*

LinChiat Chang and Jon A. Krosnick (National Surveys Via RDD Telephone Interviewing vs. The Internet: Comparing Sample Representativeness and Response Quality, Dec. 2008). (Year: 2008).*

Anonymous Social App Cloaq Lets You Secretly Comment on Anything, http://techcrunch.com/2014/04/30/cloaq-the-anonymous-social-app-that-doesnt-require-an-email-or-phone-number-goes-live/.

Dkyle, Carly, Meet Memo, the Anonymous App That Could Revolutionize the Workplace, http://www.entrepreneur.com/article/241872.

Gellman, Lindsay, The Wall Street Journal, Memo App Lets Workers Vent Anonymously, Jan. 20, 2015.

Golgowski, Nina, DailyMail.com, New websit lets you tell your boss what you Really think . . . anonymously, Aug. 3, 2012, http://www.dailymail.co.uk/news/article-2183521/New-website-TellYourBossAnything-com-lets-tell-boss-Really-think-anonymously.html.

Lee, Nicole, Secret's out: The rise and fall of the anonymous social app, Apr. 30, 2015, http://www.engadget.com/2015/04/30/secret-is-out/.

The Anonymous App That Lets You Whisper Sweet Nothings, http://www.wired.com/2014/12/anonymous-app-lets-sendsweet-nothings/.

* cited by examiner

MANAGER-EMPLOYEE COMMUNICATION

CROSS REFERENCE TO RELATED APPLICATIONS

The present application claims priority to U.S. Provisional Patent Application No. 62/075,097 filed Nov. 4, 2014, and U.S. Provisional Patent Application No. 62/210,493, filed Aug. 27, 2015, the entireties of which are incorporated herein by reference.

BACKGROUND

Companies can use workplace surveys to have employees provide anonymous answers or comments regarding various work-related topics. Such topics can include issues related to employee engagement, organizational health, and work satisfaction. Employee feedback can help an employer diagnose problems and find new opportunities for improvement. What is needed is a system whereby a manager can receive survey answers and respond to the employee in real time, including attempting to speak directly (potentially in person) with the employee, while keeping the employee in control of his or her confidentiality and whether or not the employee speaks directly with the manager, and a system that can rate manager based on such interactions with employees.

BRIEF SUMMARY

The present disclosure is directed to a method and system for communication between a manager and employee of an organization. In one aspect, the method includes on an employee device of an employee of an organization, executing a first instance of a survey application; on a manager device of a manager of the organization, executing a second instance of a survey application; transmitting survey topic data to the employee device to enable a user interface of the first instance of the survey application to display a survey topic; receiving real-time first comment data from the employee device indicating an employee comment to the survey topic; transmitting second comment data to the manager device to enable a user interface of the second instance of the survey application to display in real time the employee comment to the survey topic without identifying the employee by name; receiving contact-me data from the manager device indicating a contact-me request, the contact-me request indicating that the manager desires the employee to contact the manager directly regarding the employee comment to the survey topic; transmitting second contact-me data to the employee device in real-time to enable the user interface of the first instance of the survey application to display the contact-me request; receiving first contact-me response data from the employee device indicating in real time whether the employee will contact the manager directly; and transmitting second contact-me response data to the manager device to enable the user interface of the second instance of the survey application to display whether the employee will contact the manager directly without identifying the employee by name.

In another aspect, a method includes receiving comment data from employee devices of employees of an organization, the comment data indicating employee comments to a survey topic; receiving contact-me data from a manager device indicating contact-me requests, the contact-me requests indicating that the manager desires the employees to contact the manager directly regarding the employee comments to the survey topic; receiving contact-me response data from the employee devices indicating whether the employees will contact the manager directly; and generating a manager rating based on the saved contact-me response data.

In yet another aspect, a system includes employee devices of employees of an organization, the employee devices configured to execute a survey application; a manager device of a manager of the organization, the manager device configured to execute the survey application; and a server configured to receive comment data from the employee devices, the comment data indicating employee comments to a survey topic; receive contact-me data from the manager device indicating contact-me requests, the contact-me requests indicating that the manager desires the employees to contact the manager directly regarding the employee comments to the survey topic; receive contact-me response data from the employee devices indicating whether the employees will contact the manager directly; and generating a manager rating based on the saved contact-me response data.

BRIEF DESCRIPTION OF THE DRAWINGS

The invention of the present disclosure will become more fully understood from the detailed description and the accompanying drawings, wherein.

DETAILED DESCRIPTION

Figure 1:
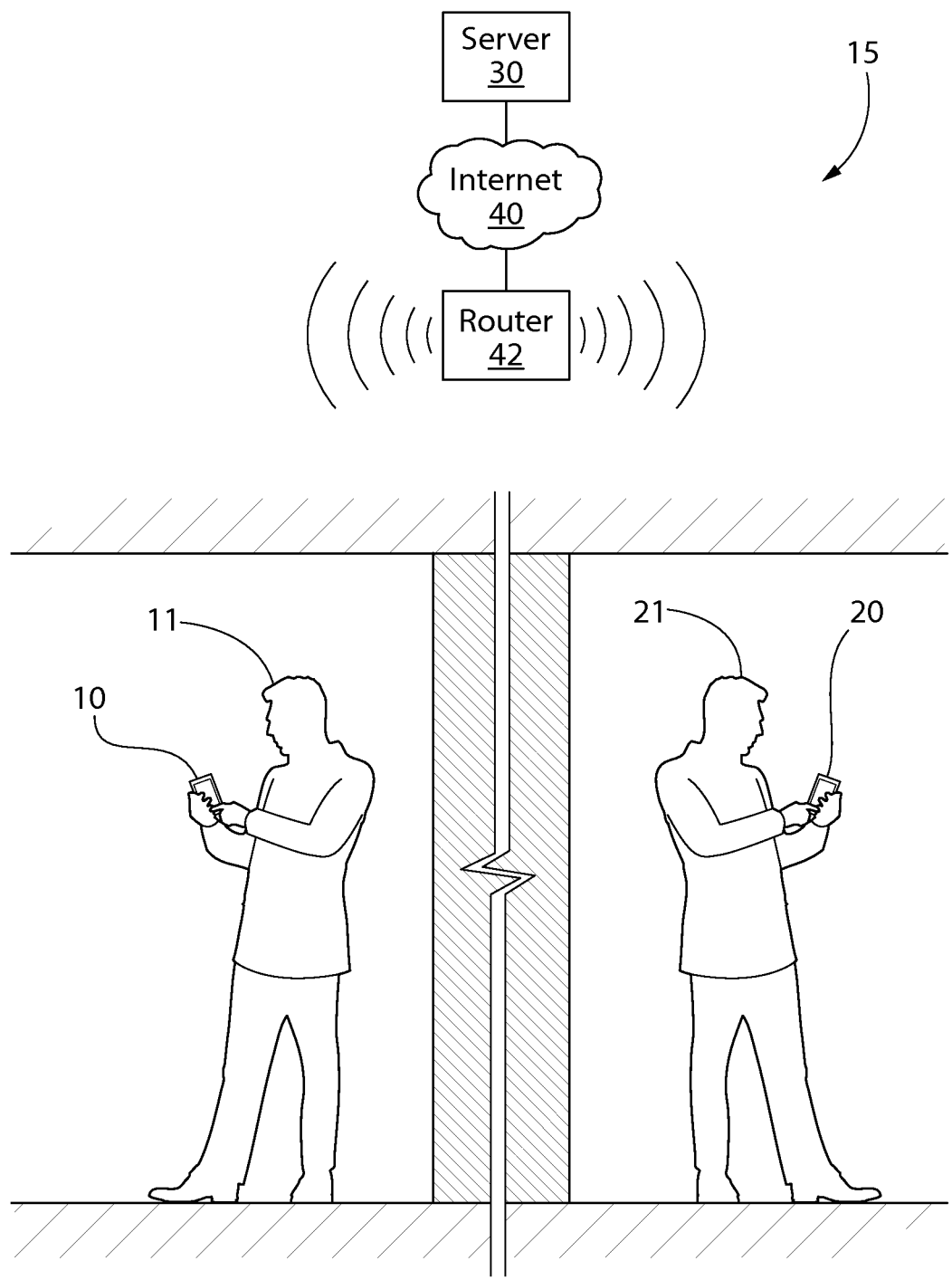
FIG. 1 is a block diagram of a system according to one embodiment of the invention.

The following description of the preferred embodiment(s) is merely exemplary in nature and is in no way intended to limit the invention. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. The discussion herein describes and illustrates some possible non-limiting combinations of features that may exist alone or in other combinations of features.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring now to FIG. 1, a block diagram of a system 15 according to one embodiment of the invention is shown. The exemplified system 15 includes a server 30 and a router 42 connected to the internet 40, as well as an employee device 10 and a manager device 20. The employee device 10 belongs to an employee 11 of an organization. The employee 11 can be any member or worker of an organization, including a contractor or non-paid volunteer. The manager device 20 belongs to a manager 21 of the employee 11. The manager 21 can be any member of the organization that has some degree of authority to assess the performance of the employee 11.

The server 30 can be any computer or processor (or collection thereof) for carrying out programs in accord with the functions described herein. In the exemplified embodiment, the server 30 communicates with the employee and manager devices 10, 20 through an internet connection and the router 42 providing wireless internet connection to the employee and manager devices 10, 20. The invention is not so limited. In other embodiments, the server 42 can communicate with the employee and/or manager devices 10, 20 through any standard communication means, including through use of a telecommunication network (e.g., 3G or 4G) or a wired internet connection (e.g., wired Ethernet cables).

In the exemplified embodiment, the employee and manager devices 10, 20 are mobile smartphones. In other embodiments, the devices 10, 20 can be any computer devices capable of carrying out programs in accord with the functions described herein (including laptop computers, desktop computers, and tablets).

Figure 2:
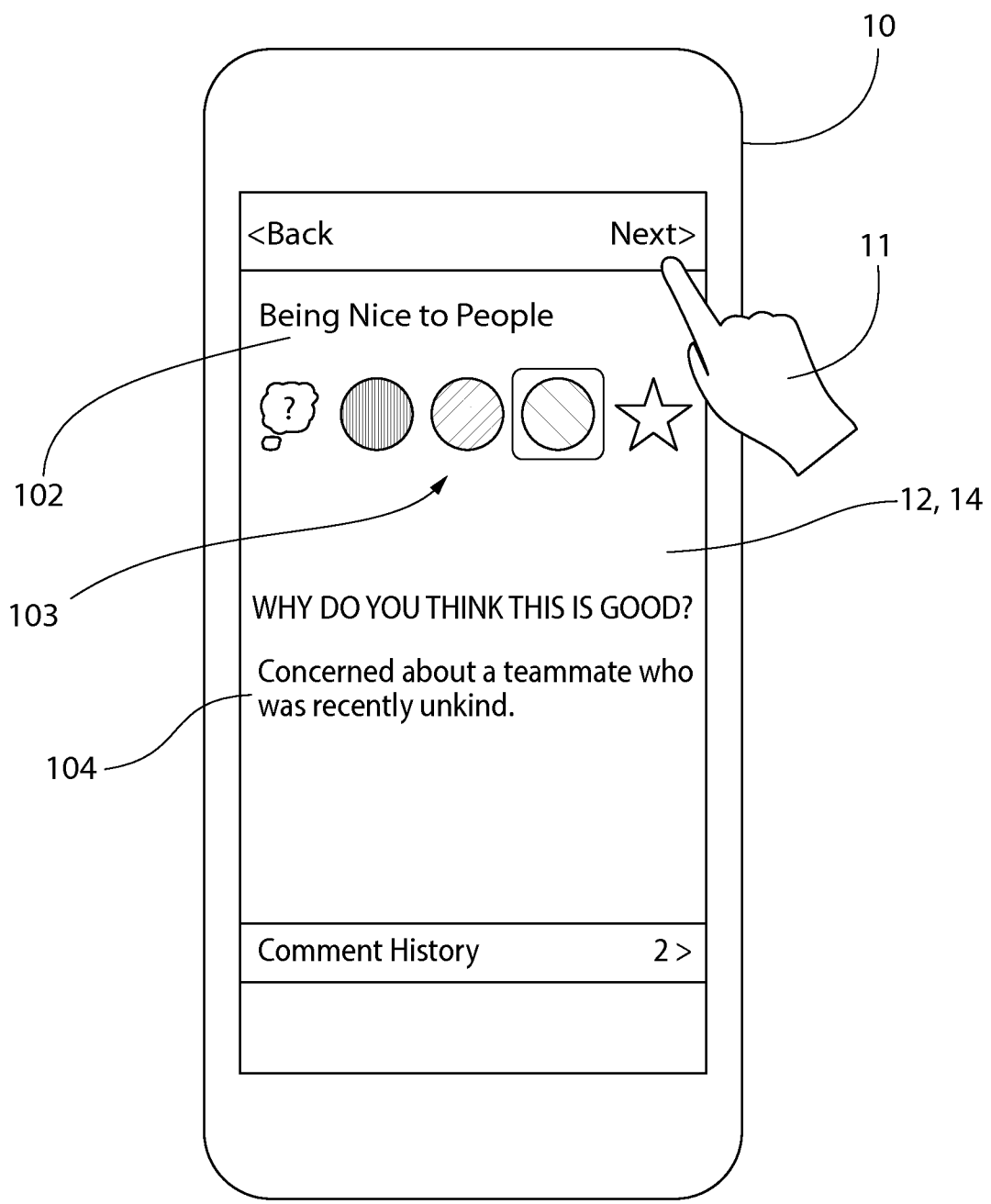
FIG. 2 is an image of an employee user interface where an employee posts a response according to one embodiment of the invention.

FIG. 2 is an image of an employee device 10 and user interface 14 where an employee 11 posts a comment 104 according to one embodiment of the invention. The employee device 10 shows a first instance of a survey application 12. In the exemplified embodiment, the survey application is a smartphone application. In other embodiments, the survey application can be any program for carrying out the functions described herein, including programs running on a laptop or desktop computer. The survey application 12 and employee device 10 provide an employee user interface 14. In the exemplified embodiment, the user interface 14 utilizes a touch screen provided by the smartphone. In other embodiments, the user interface can be any user interface capable of enabling a user to communicate with and carry out the functions described herein, including an interface utilizing a computer monitor, mouse, and/or keyboard.

The employee user interface 14 shows a survey topic 102 for the employee 11, namely, "Being Nice to People." The survey topic 102 can be any question or topic for which an employee can provide a response or rating. The employee user interface 14 provides options 103 for an employee rating. In the exemplified embodiment, there are five employee rating options 103 to choose from (from left to right): a question cloud, a red circle, an amber circle, a green circle, and a star. These options 103 represent different ratings of how the company is doing regarding being nice to people. In the exemplified embodiment, the question cloud represents the No Answer response, which can be described as follows: "I don't care. I can't decide. I don't understand. My feedback won't matter. I'm worried about being honest. Or, this isn't applicable to me." The red circle represents the Bad rating, which can be described as follows: "There are significant problems that need to be dealt with urgently." The yellow circle represents the Needs Improvement rating, which can be described as follows: "There are obvious and valuable improvements that can be made." The green circle represents the Good rating, which can be described as follows: "Nothing's perfect, but my job is good overall." Finally, the star represents the Exceptional rating, which can be described as follows: "My job here is better than anywhere else I know of." In the exemplified embodiment, the green option has been chosen. In other embodiments, other employee rating options having other meanings can be available, or no employee rating options at all.

In the exemplified embodiment, the employee 11 is also asked to comment on why the chosen employee rating option was chosen. In this embodiment, the employee 11 can provide an unstructured written comment 104. In the exemplified embodiment, the employee 11 expresses concern about a teammate that was unkind. In other embodiments, structured responses (e.g., a list of possible explanations) can be provided for selection and/or unstructured responses can be eliminated.

In the exemplified embodiment, the term employee comment refers to the unstructured employee comment 104. In other embodiments, however, employee comment can refer to a chosen employee rating option (such as employee rating options 103), a combination of an employee rating and an employee comment, or another type of response or comment to a survey topic.

Figure 3:
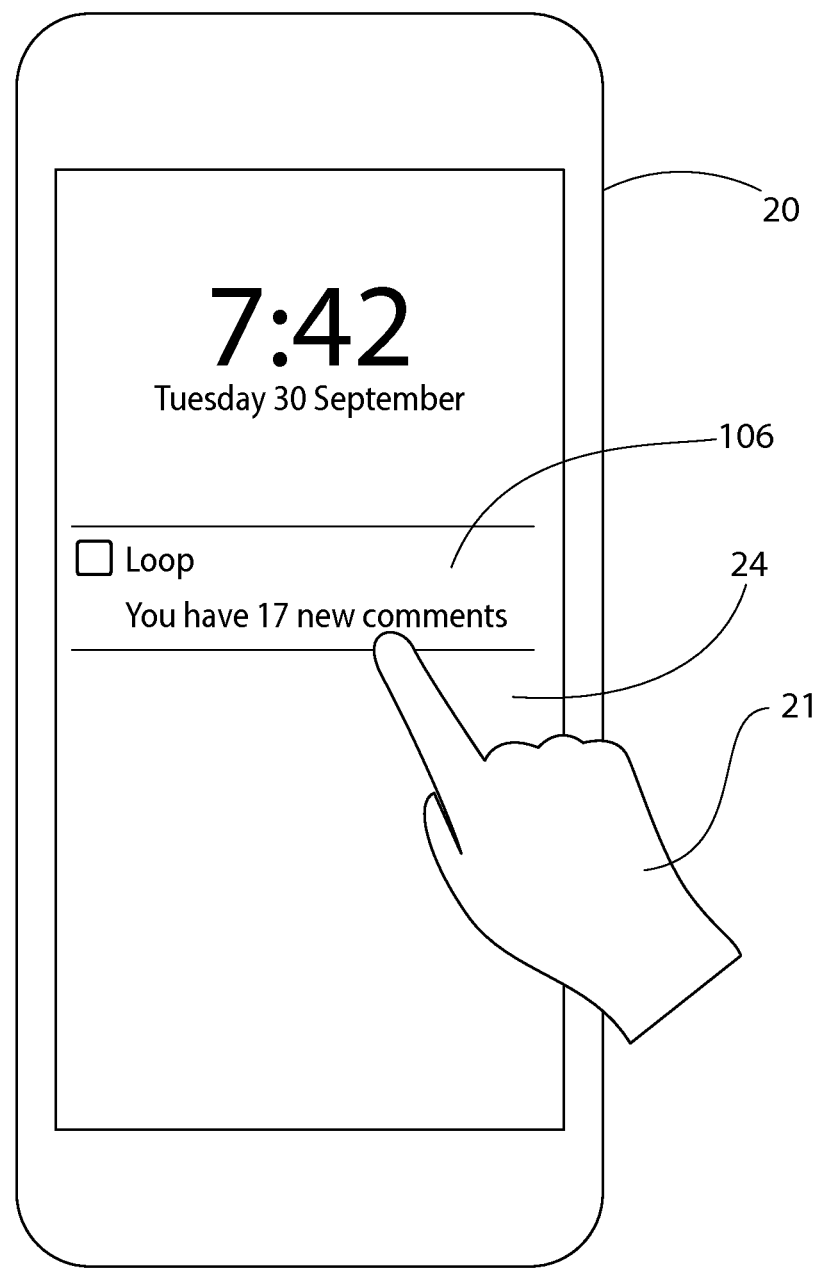
FIG. 3 is an image of a manager user interface where a manager receives notice of an employee comment according to one embodiment of the invention.

FIG. 3 is an image of a manager user interface 24 where a manager device 24 receives notice 106 of an employee comment 104 according to one embodiment of the invention. In the exemplified embodiment, a notice 106 appears on the lock screen of the manager user interface 24 indicating the number of new survey comments provided. In this embodiment, the manager 21 can select the notice 106 or open the application to view the employee comment 104. In other embodiments, notice can be provided by other means (such as an alert within the application or an email) or can be omitted.

Figure 4A:
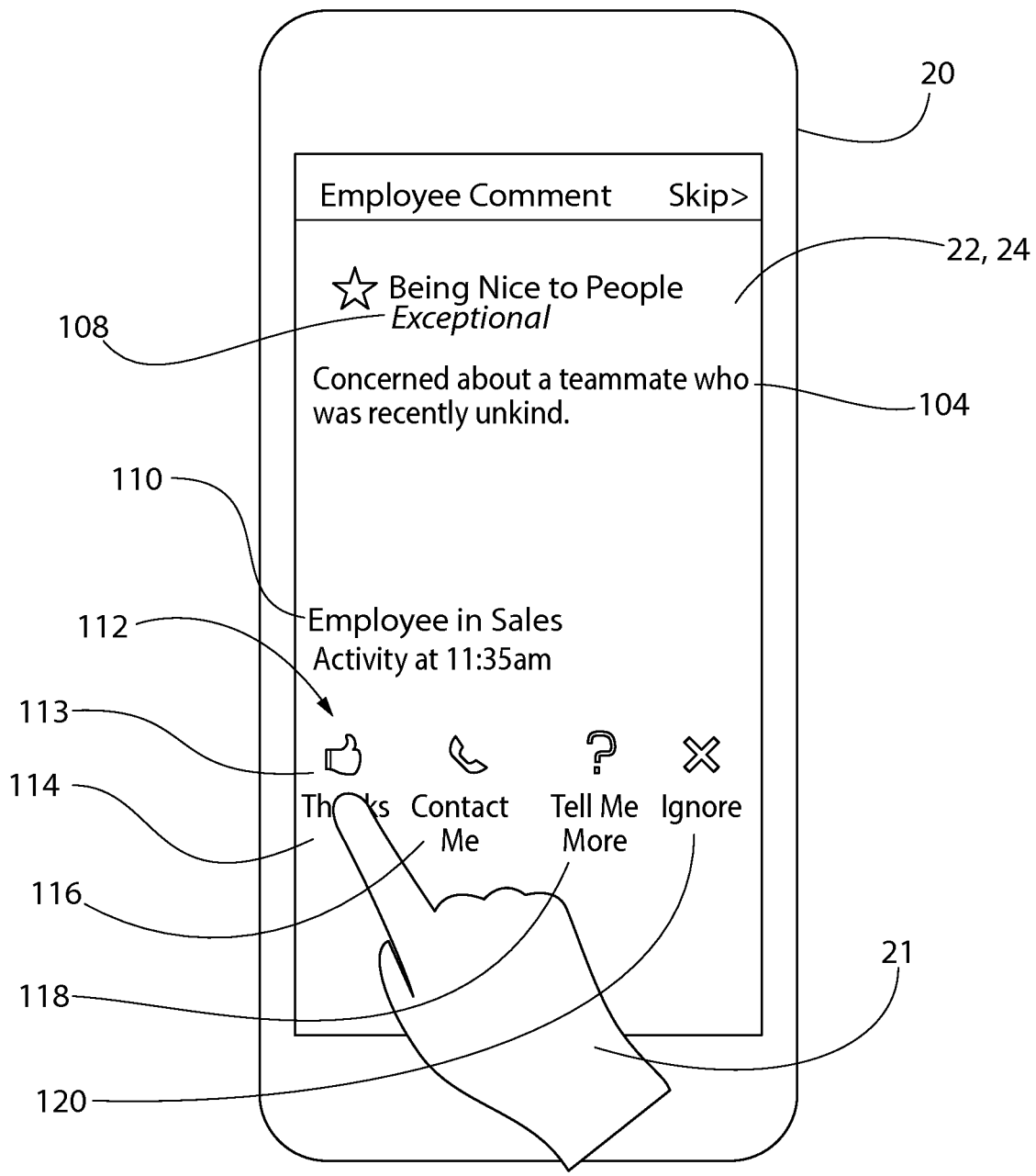
FIG. 4A is an image of a manager user interface where a manager responds to the employee comment according to one embodiment of the invention.

FIG. 4A is an image of a manager user interface 24 of the manager device 20 where a manager 21 responds to the employee comment 104 according to one embodiment of the invention. In the exemplified embodiment, the manager 21 opens a second instance of the survey application 22 to view the employee comment 104. The second instance of the survey application 22 can be any program designed to carry out the functions described herein. In the exemplified embodiment, the second instance of the survey application 22 is similar to the first instance of the survey application 12, but with options unique to the manager.

The particular manager user interface 24 shown in this figure is sometimes referred to as the Employee Comment interface. At this interface 24, the manager 21 can view and respond to an employee comment 104. The survey topic 102 is indicated at the top of the interface 24, with the relevant employee comment 104 below. The system provides the manager four manager options 112 for responding to the comment: Thanks 114, Contact Me 116, Tell Me More 118, and Ignore 120.

The manager 21 can also provide a response rating 108. In the exemplified embodiment, the manager 21 can click the star icon to generate a response rating 108 of Exceptional, a rating that can be described as follows: "This comment could have a major impact on improving the business. This rating is extremely rare, as managers can mark at most one out of every fifty comments as exceptional." In other embodiments, other response ratings can be provided, or the response rating can be omitted. The manager also has an option to skip the Employee Comment interface.

In the exemplified embodiment, the employee 11 that made the employee comment 104 is not identified by name. Rather, the employee is identified using a generic identifier 110, namely, "Employee in Sales." Such an identifier protects the confidentiality of the employee 11, allowing the employee 11 to provide information that the employee 11 may otherwise be afraid to convey. Other embodiments can use other identifiers (e.g., a number, symbol, or the employee's name), or no identifier.

In the exemplified embodiment, the generic identifier 110 is used because of a default confidentiality level chosen by the employee 11. In this embodiment, each employee 11 can choose a default confidentiality level. Non-limiting examples of chosen default confidentiality levels are Fearless, A Little Worried, and Scared. The level chosen will control how the employee is identified. For example, when an employee submits a comment, the employee can be identified by the employee's name, as an employee of a certain department, as an employee of a larger department, or simply as an employee of the company, depending on the level of confidentiality desired.

Figure 4B:
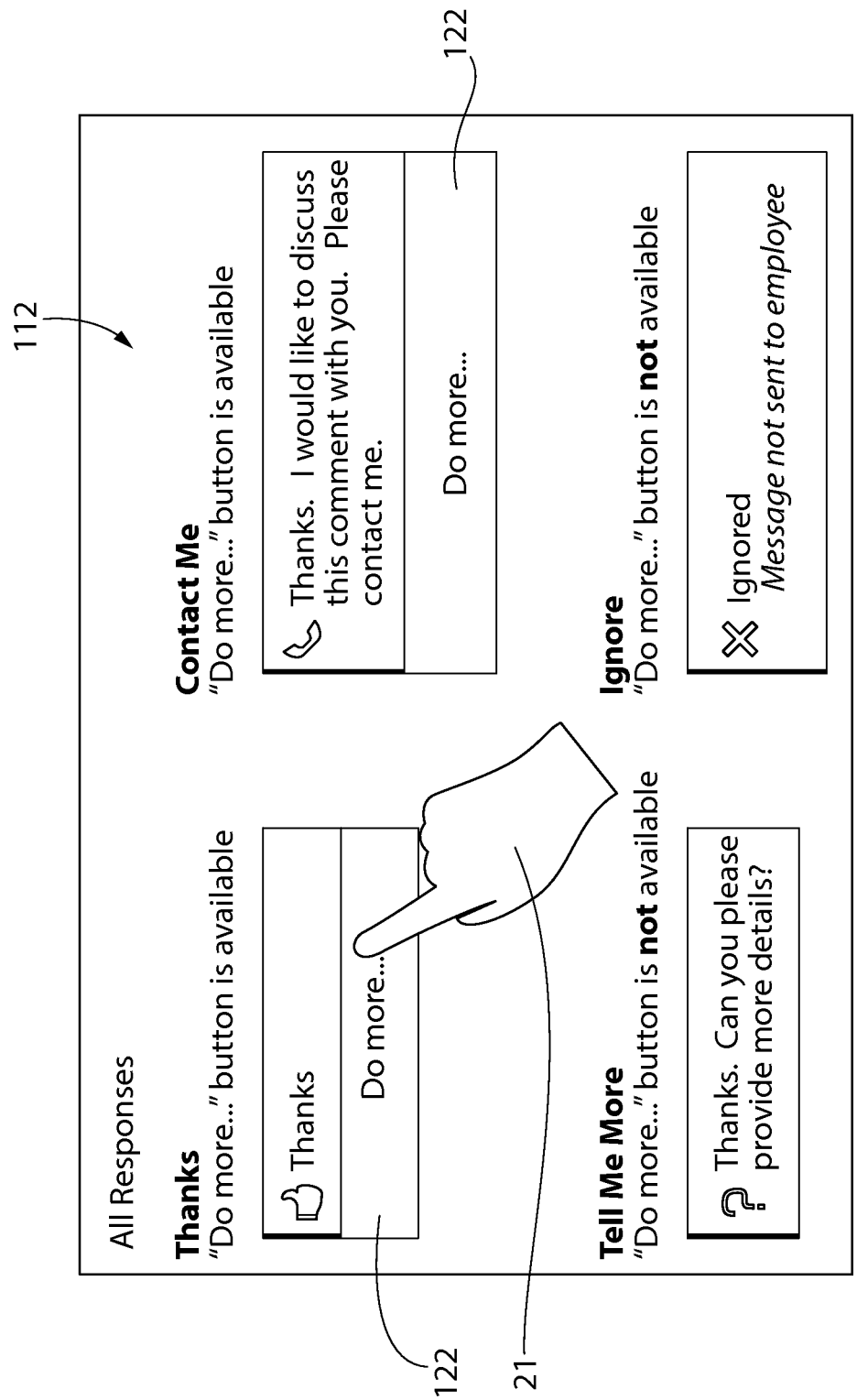
FIG. 4B is an image showing different manager options for responding to the employee comment according to one embodiment of the invention.

FIG. 4B is an image showing different manager options 112 for responding to the employee comment 104 according to one embodiment of the invention. If the manager 21 chooses the Thanks option 114 from the interface 44 of FIG. 4A, the system can send the employee 11 a notice thanking the employee 11 for the comment 104. Further, a Do More option 122 is available (discussed below). If the manager 21 chooses the Tell Me More option 118, the system can send the employee 11 a notice asking the employee 11 to for more information regarding the employee comment 104. The Do More option 122 is not available. If the manager 21 chooses the Contact Me option 116, the system can send the employee 11 a notice asking the employee to contact the manager about the comment 104. Also, the Do More option 122 is available. If the manager chooses the Ignore option 120, the system can remove the employee comment 104 from the manager's view. The Do More option 122 can be made available if the Ignore option 120 is chosen. In other embodiments, other options for response can be made available. Selection of an option such as Tell Me More or Contact Me can enable endless, anonymous back-and-forth communication between the employer and the employee.

Figure 5A:
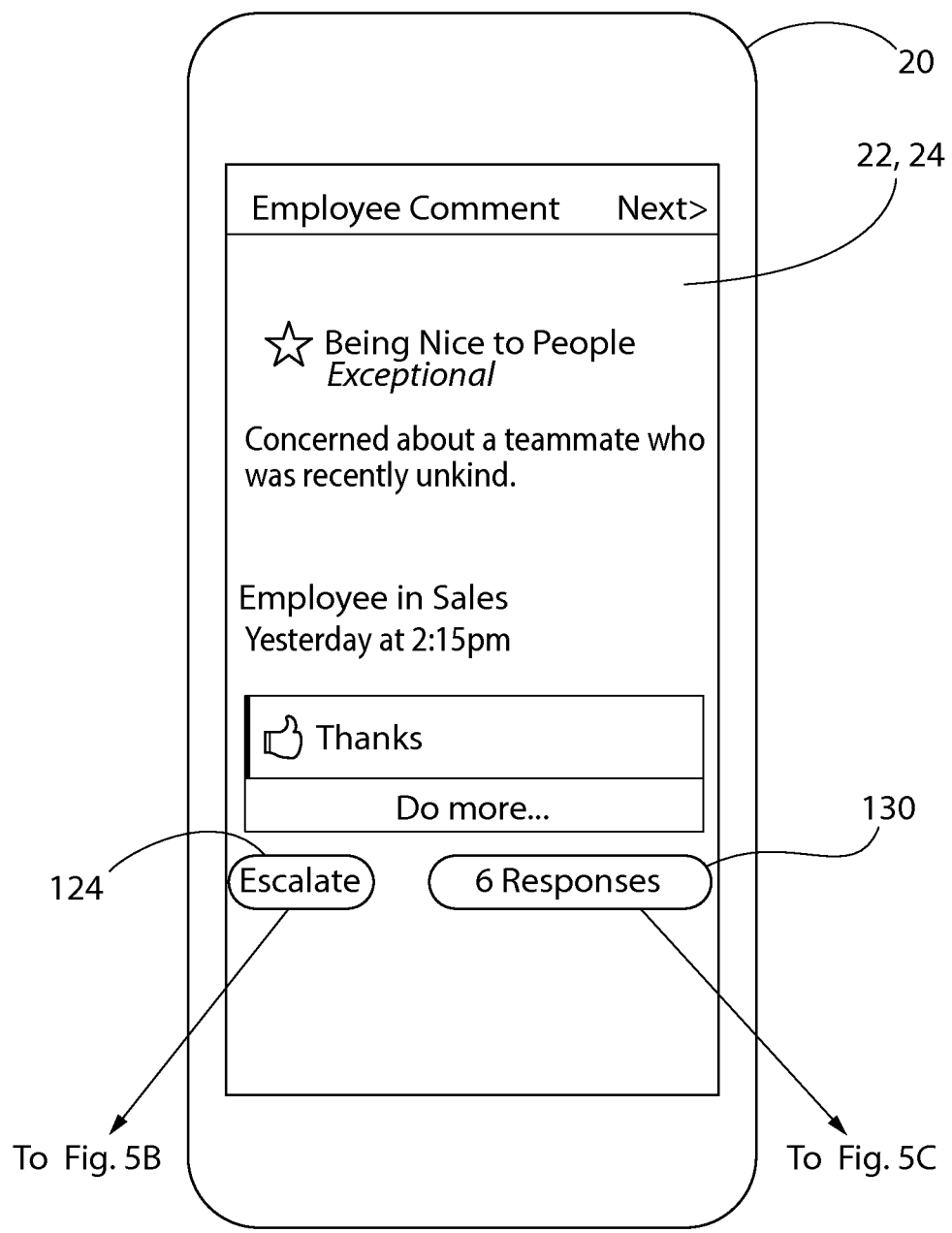
FIGS. 5A-C are images of manager user interfaces showing additional manager options after a manager chooses the Thanks option according to one embodiment of the invention.
Figure 5B:
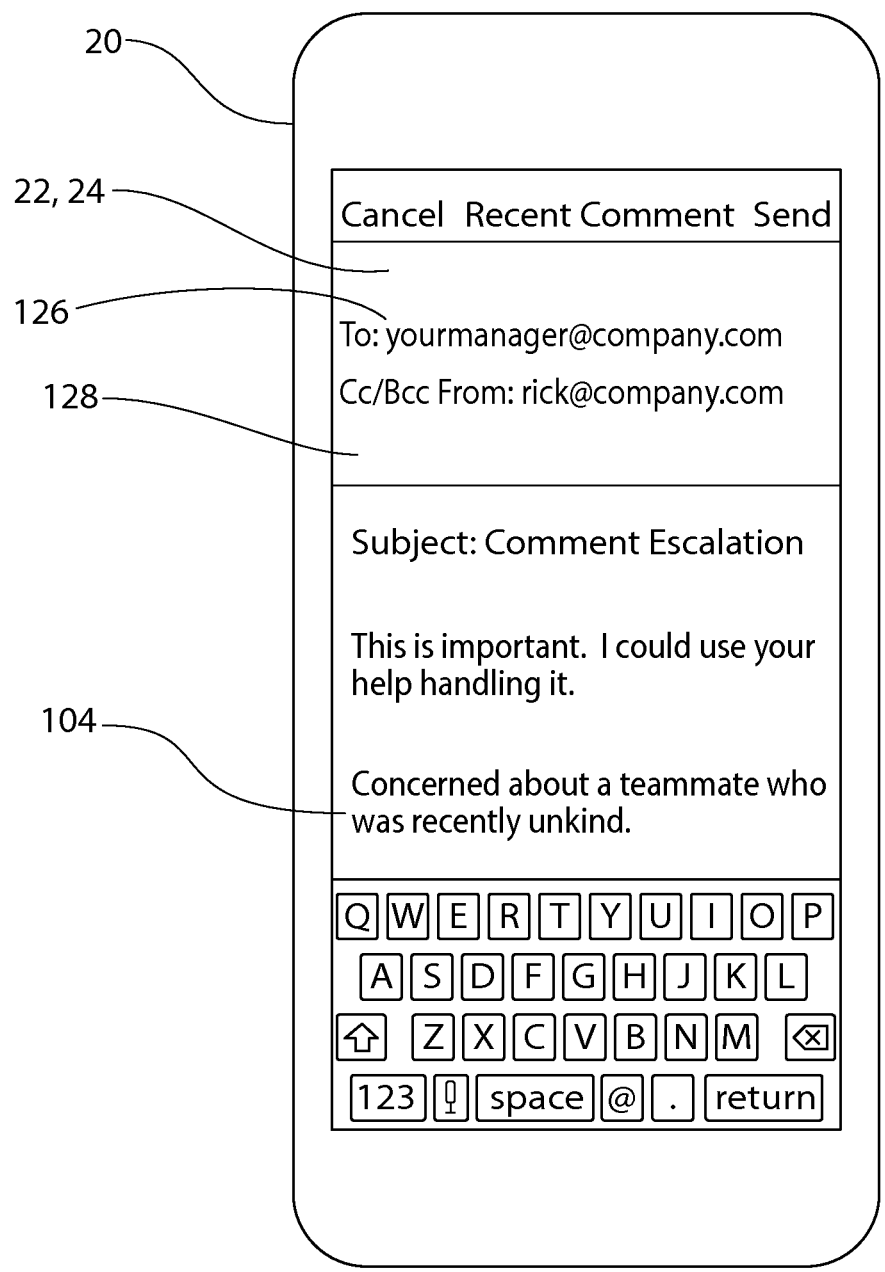
Figure 5C:
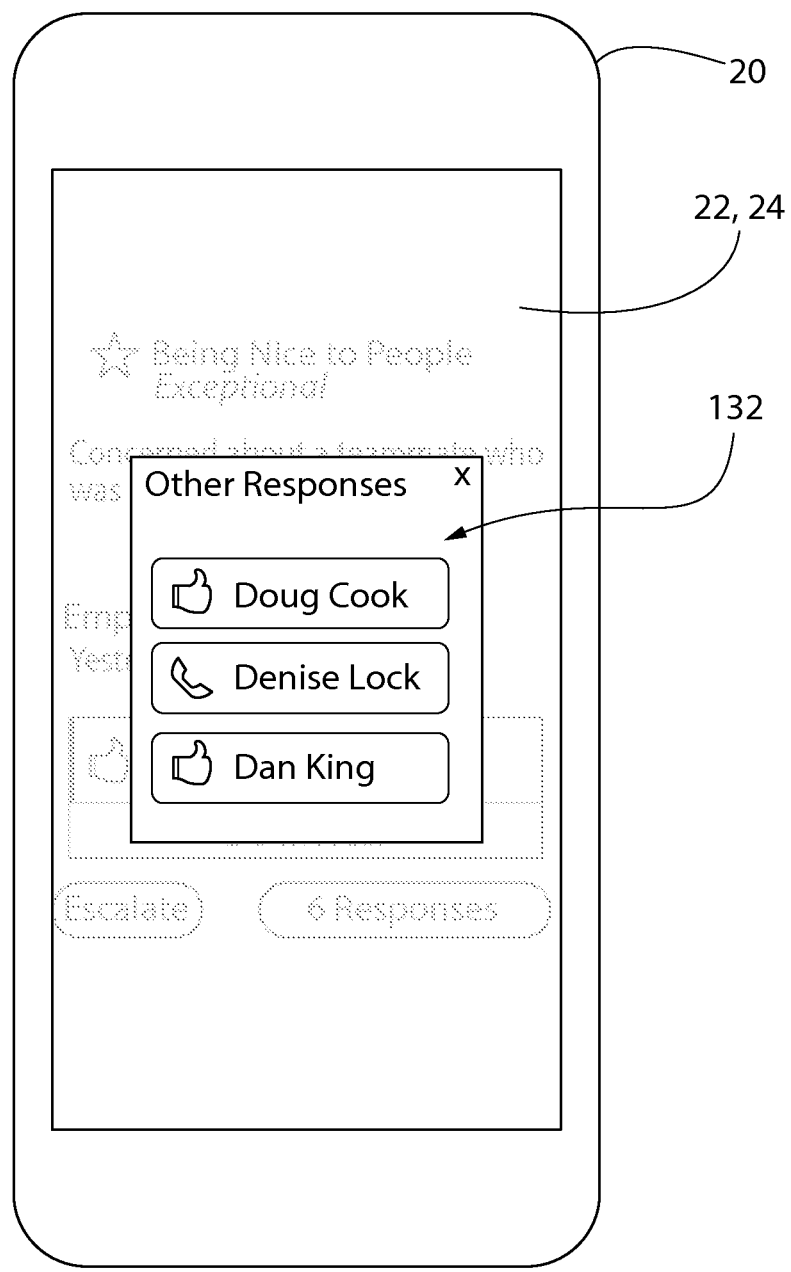

FIGS. 5A-C are images of manager user interfaces 24 showing additional manager options after a manager 21 chooses the Thanks option 112 according to one embodiment of the invention. Specifically, FIG. 5A shows an Escalate option 124 and an Other Responses option 130. FIG. 5B shows a draft email 128 automatically generated when the Escalate option 124 is chosen. The "To:" portion is automatically populated with a superior email address 126, that is, the email address of a member of the organization that is a superior to the manager 21. A generic message is also provided asking the superior for help in addressing the comment 104. The generic message includes the employee comment 104.

FIG. 5C shows a user interface 24 where the other response option 130 is chosen. Selection of this option can enable a manager 21, before deciding how to proceed, to view other responses 132 to see how other managers responded to the employee comment 104. The manager 21 can select one of the displayed manager responses to see the full manager response. In other embodiments, other options can be made available.

Figure 6A:
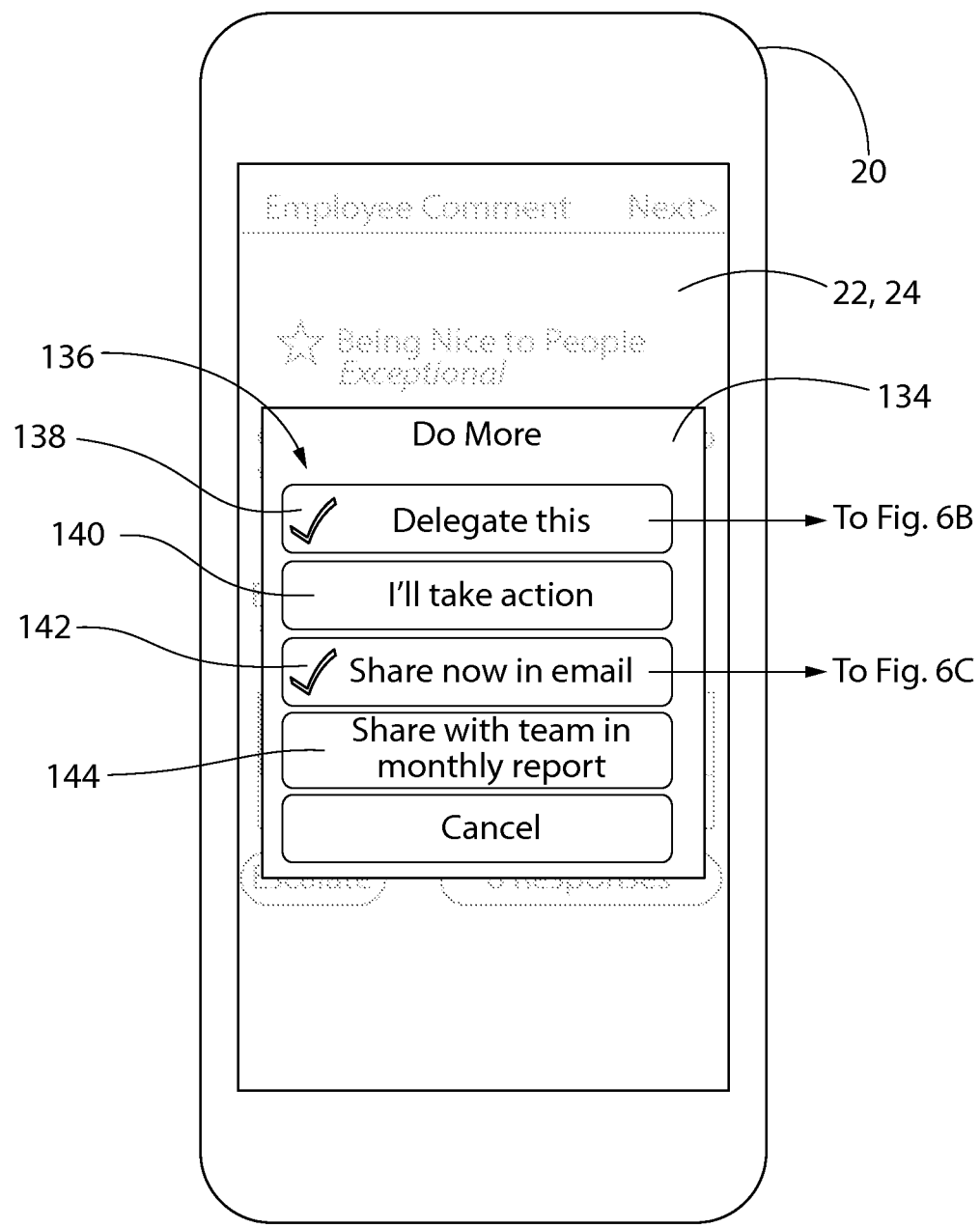
FIGS. 6A-C are images of a manager user interface showing a do-more modal according to one embodiment of the invention.
Figure 6B:
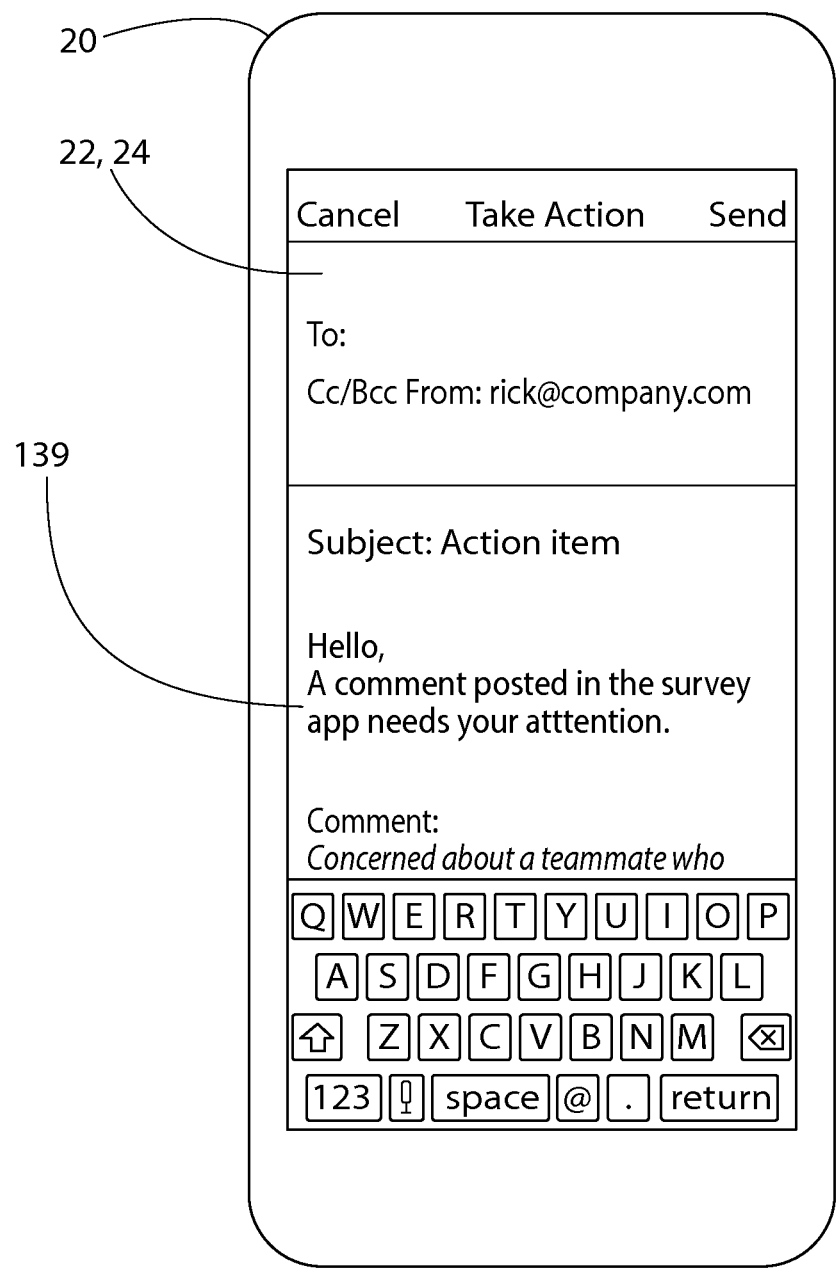
Figure 6C:
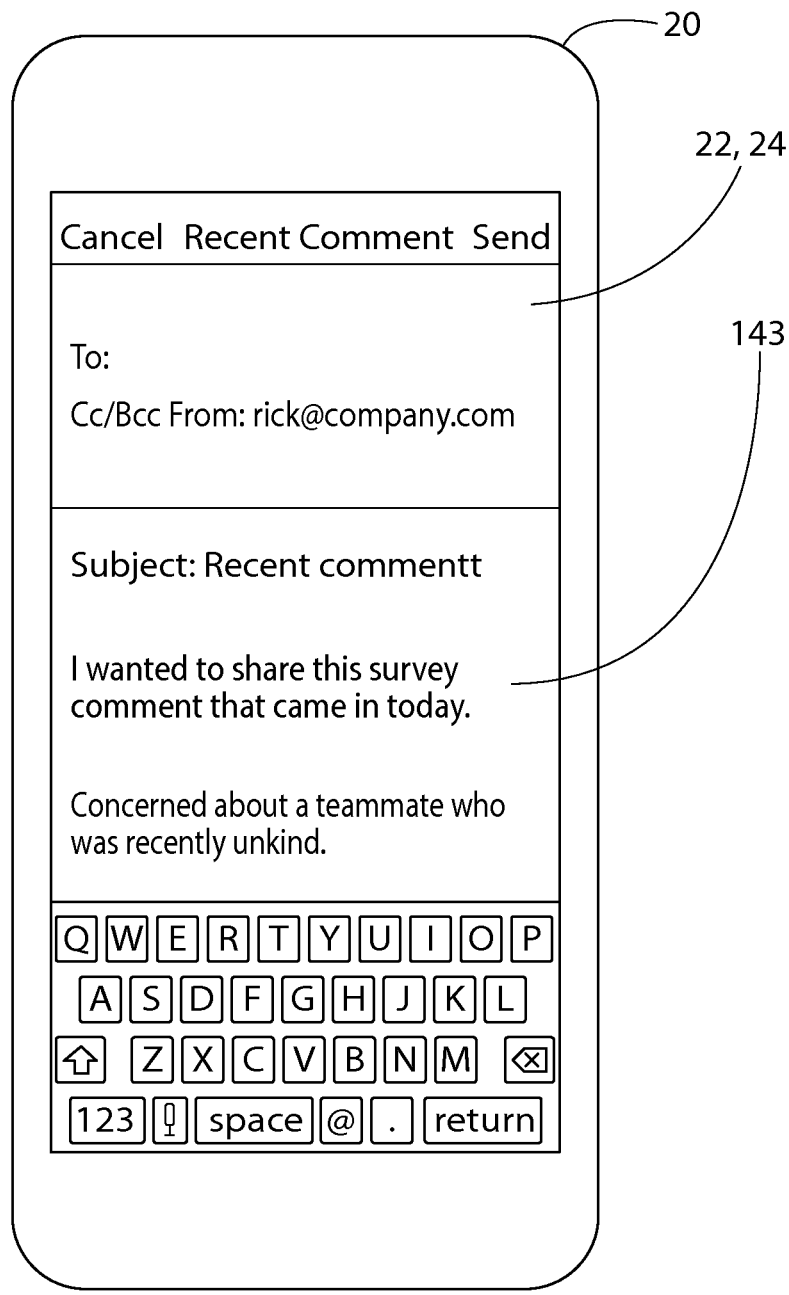

FIGS. 6A-C are images of a manager user interface 24 showing a do-more modal 134 according to one embodiment of the invention. FIG. 6A shows the do-more options 136 available when a user selects the Do More option 122 shown in FIG. 4B. There are five do-more options 136: Delegate this 138, I'll take action 140, Share now in email 142, Share with team in monthly report 144, and Cancel.

FIG. 6B shows an email 139 generated when a manager 21 selects Delegate this 138. The email 139 is pre-populated with a generic message asking the recipient to address the employee comment 104.

FIG. 6C shows an email 143 generated when the manager 21 selects Share now in an email 142. The email 143 includes a generic message sharing the employee comment 104.

If I'll take action 140 or Share with team in monthly report 144 is selected, a toast message can be activated that overlays the rest of the user interface 24 that the manager 21 can dismiss or that auto-dismisses. I'll take action 140 enables a manager 21 to notify other managers that the manager 21 will handle the comment. Share with team in monthly report 144 enables the manager 21 to automatically add the employee comment 104 to the next monthly report. If Cancel is selected, the Do More Modal 134 is closed.

Figure 7:
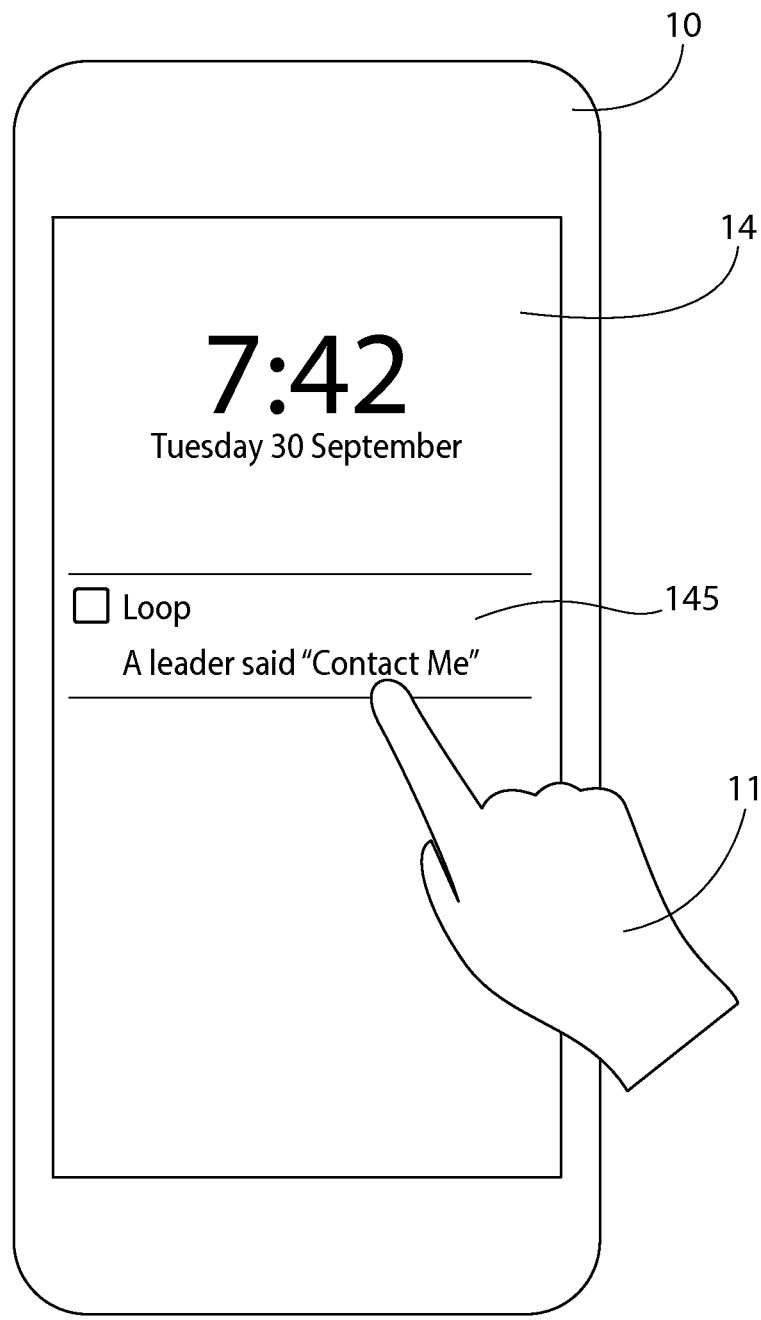
FIG. 7 is an image of an employee user interface receiving a contact-me notice according to one embodiment of the invention.

FIG. 7 is an image of an employee user interface 14 receiving a contact-me notice 145 according to one embodiment of the invention. In the exemplified embodiment, the notice 145 appears on the lock screen of the employee user interface 14 indicating a contact-me request has been made. A contact-me request is understood as a request from a manager to an employee indicating a desire that the employee contact the manager directly. Such contact can be, for example, in person, by phone, by e-mail, or another method that allows anonymous back-and-forth communication.

In this embodiment, the employee 11 can select the notice 145 or open the application to view the employee comment 104. In other embodiments, notice can be provided by other means (such as an alert within the application or an email), or can be omitted.

Figure 8A:
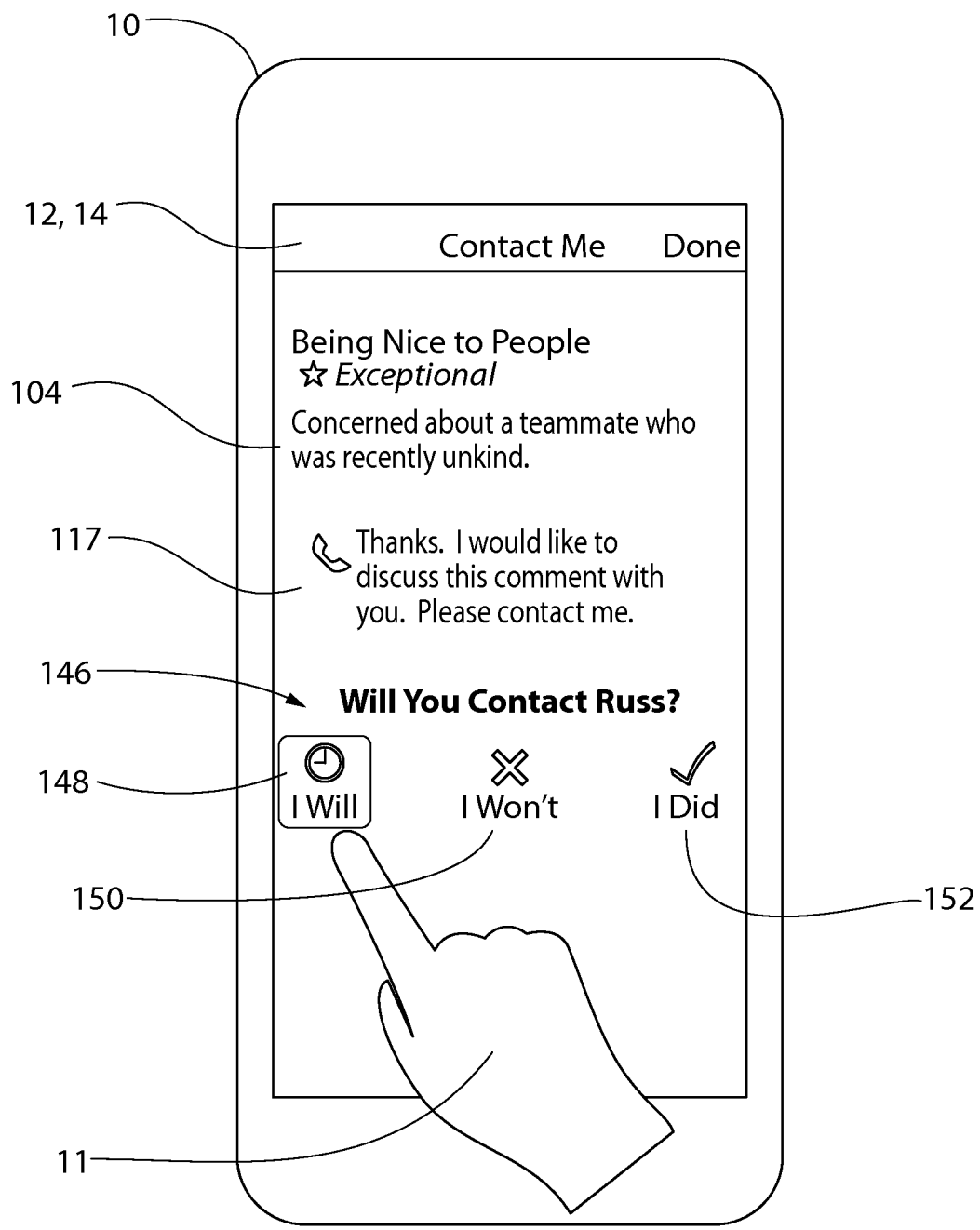
FIGS. 8A-C are images of an employee user interface showing the employee indicating an intent to respond to the manager's contact-me request according to one embodiment of the present invention.
Figure 8B:
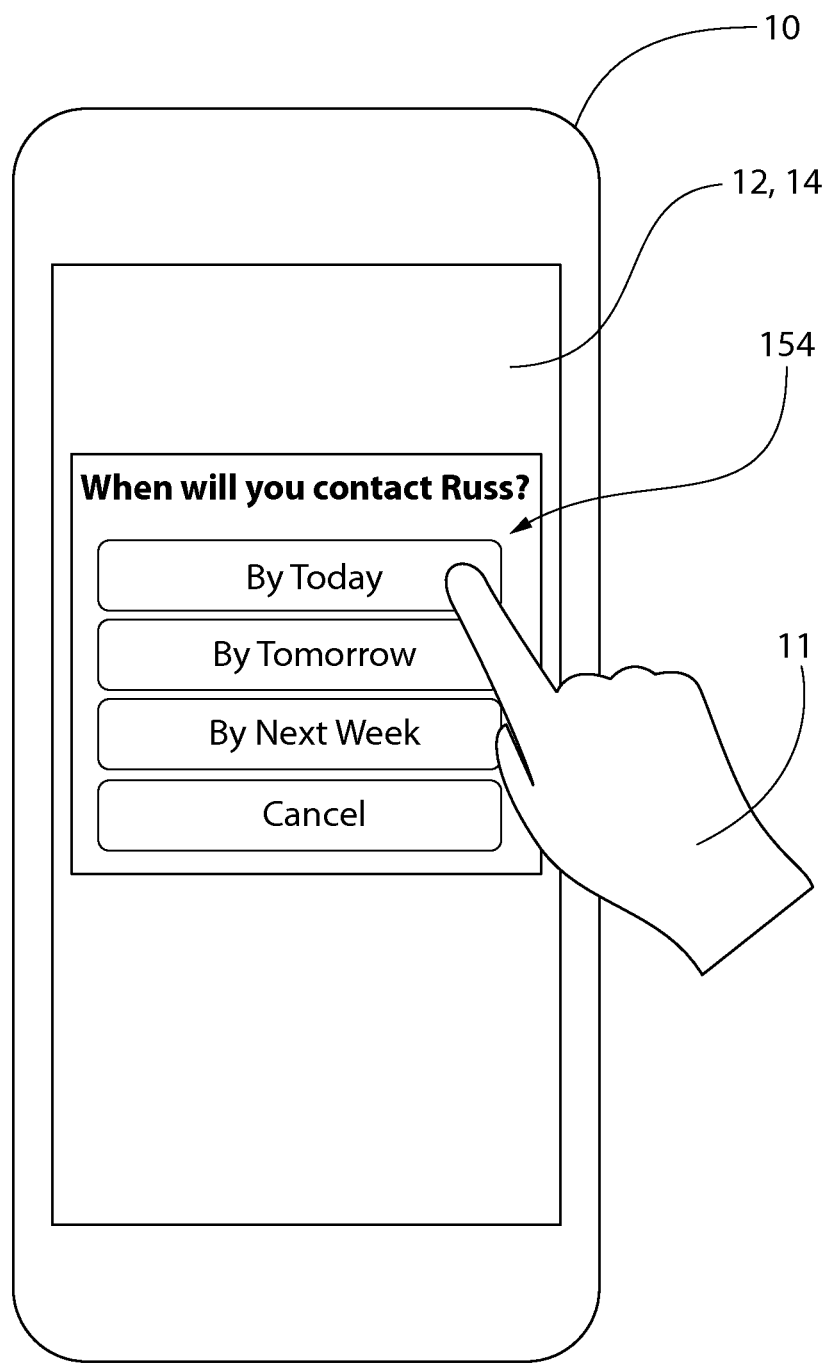
Figure 8C:
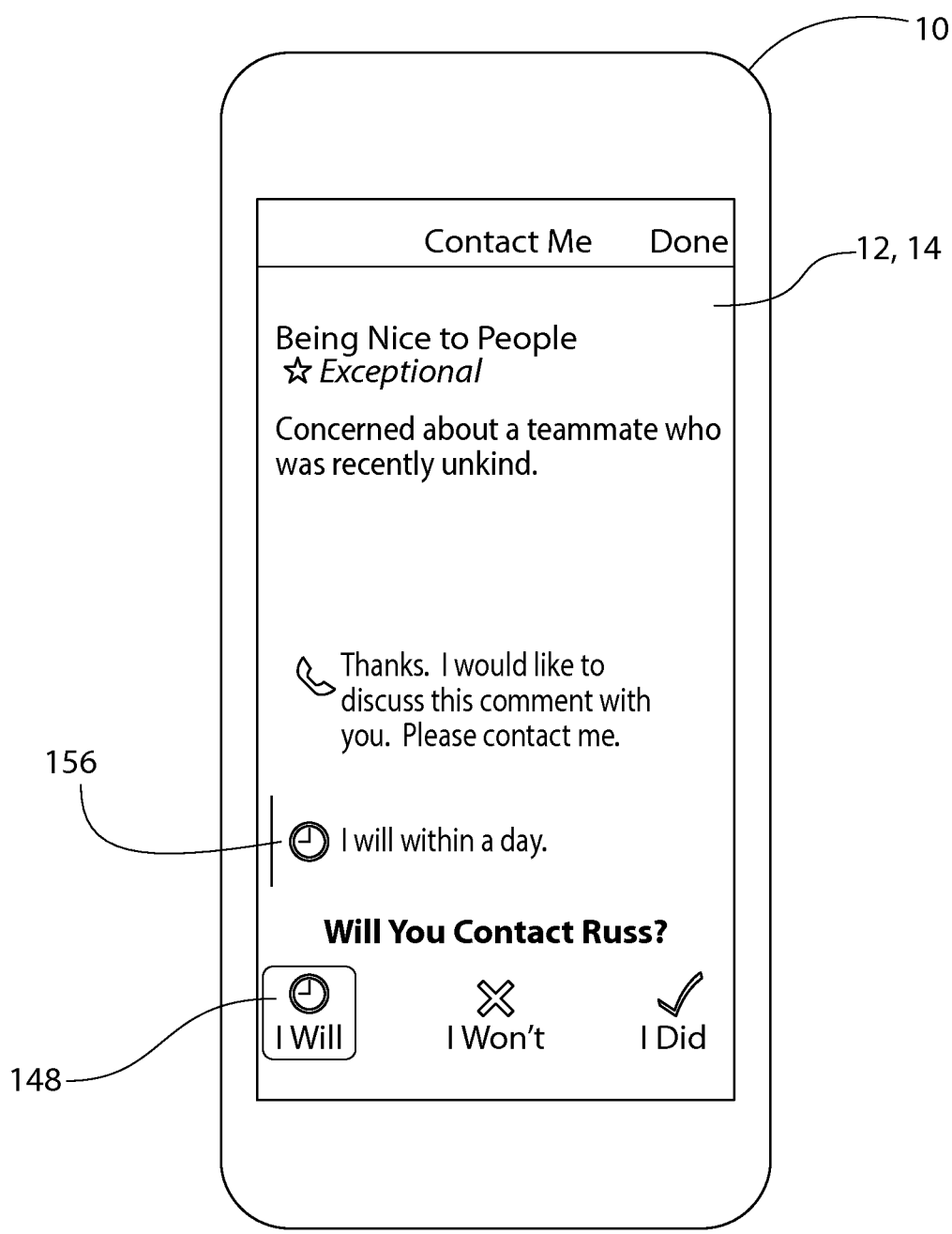

FIGS. 8A-C are images of an employee user interface 14 showing the employee 11 indicating an intent to respond to the manager's contact-me request according to one embodiment of the present invention. This particular employee user interface 14 is sometimes referred to as the Contact Me interface. At this interface 14, the employee 11 can see that his employee comment 104 has been rated Exceptional. Further, the employee 11 can see a contact-me request 117 whereby the manager 21 asks the employee 11 to contact the manager 21 to discuss the employee comment 104. The employee 11 is asked whether he will contact the manager 21 (named "Russ" in FIG. 8A). The employee 11 is given three contact-me response options 146: I Will 148, I Won't 150, and I Did 152. In FIG. 8A, the employee 11 selects I Will 148, indicating the employee 11 will contact the manager 21 regarding the employee comment 104.

FIG. 8B shows a window that appears when the employee 11 selects I Will 148. The window asks the employee 11 a follow-up question, namely, when the employee 11 will contact the manager 21. The employee 11 is given four time options 154: By Today, By Tomorrow, By Next Week, and Cancel. In other embodiments, other time options can be provided, or the time options can be omitted.

FIG. 8C shows a return to the Contact Me interface after selecting By Today. The Contact Me interface accordingly now shows the selected time option as the employee status 156. The I Will 148 selection is shown as selected.

Figure 9:
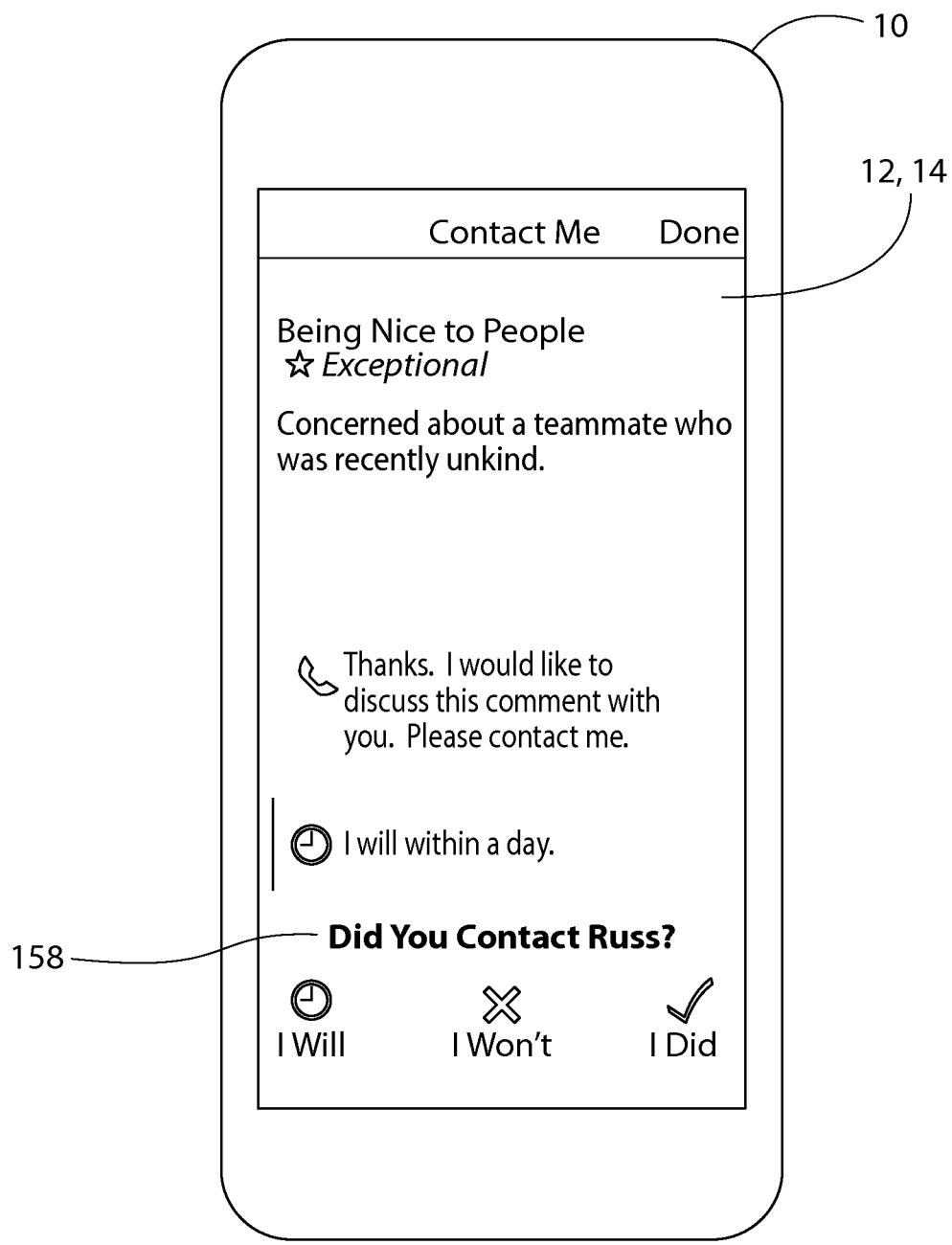
FIG. 9 is an image of an employee user interface showing a follow-up question for the employee changing after time passes according to one embodiment of the present invention.

FIG. 9 is an image of an employee user interface 14 showing a follow-up question 158 changing after time passes according to one embodiment of the present invention. In this example, the time selected by the employee from the time options 154 (FIG. 8B) for contacting the manager 21 has passed. The follow-up question 158 has changed from asking whether the employee 11 will contact the manager 21 to asking whether the employee 11 did contact the manager 21.

Figure 10:
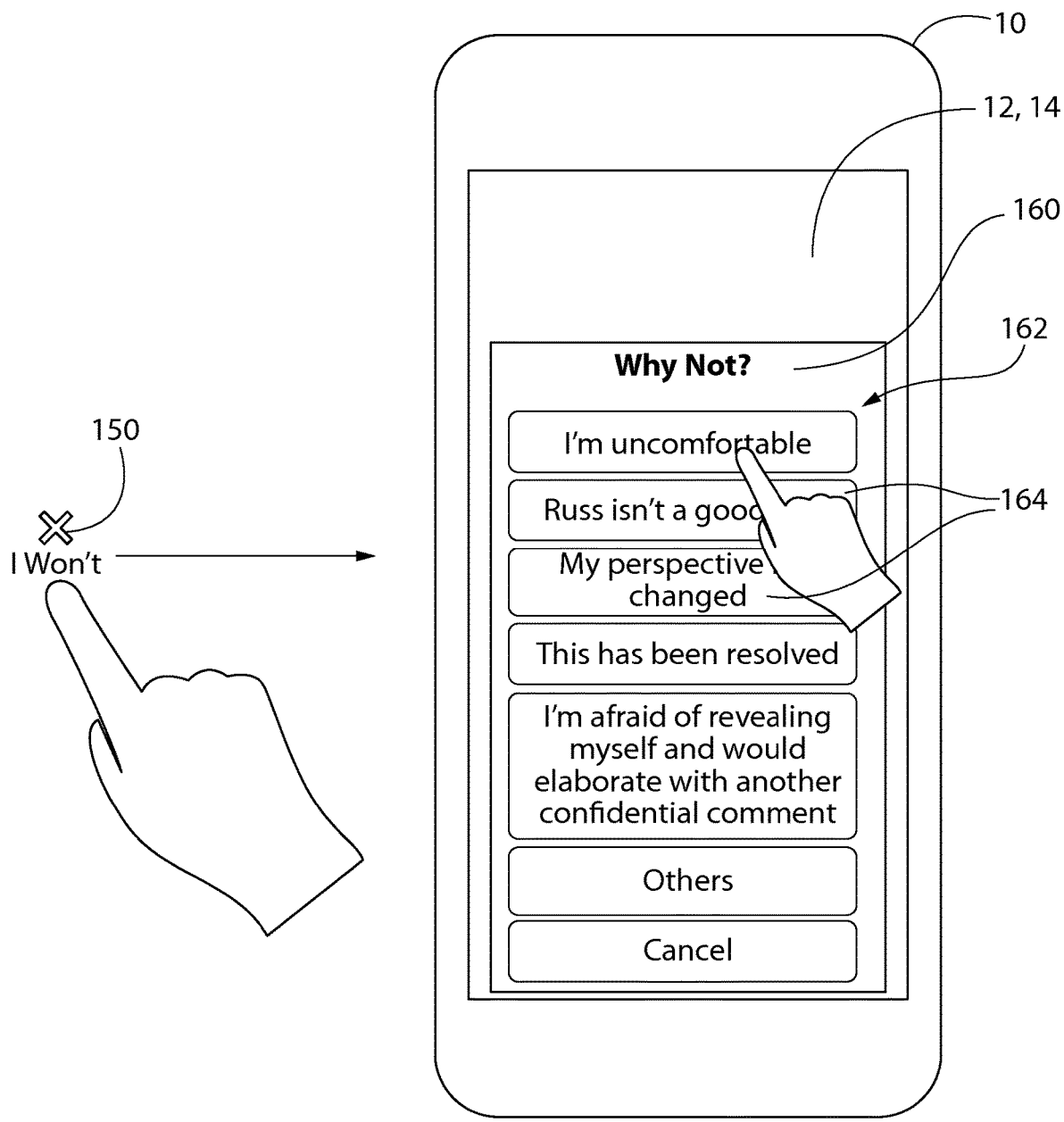
FIG. 10 is an image of an employee user interface showing an employee declining a contact-me request according to one embodiment of the present invention.

FIG. 10 is an image of an employee user interface 14 showing an employee 11 declining a contact-me request 117 according to one embodiment of the present invention. From the Contact Me user interface (see, e.g., FIG. 9), the employee has selected the I Won't option 150. A window appears asking a question 160, namely, "Why Not?" Several options 162 for response are provided, namely, I'm uncomfortable, [The manager] isn't a good listener, My perspective has changed, This has been resolved, I'm afraid of revealing myself and would elaborate with another confidential comment, Other, and Cancel. These options 162 include options critical of the manager 164. In other embodiments, other options can be provided.

Figure 11:
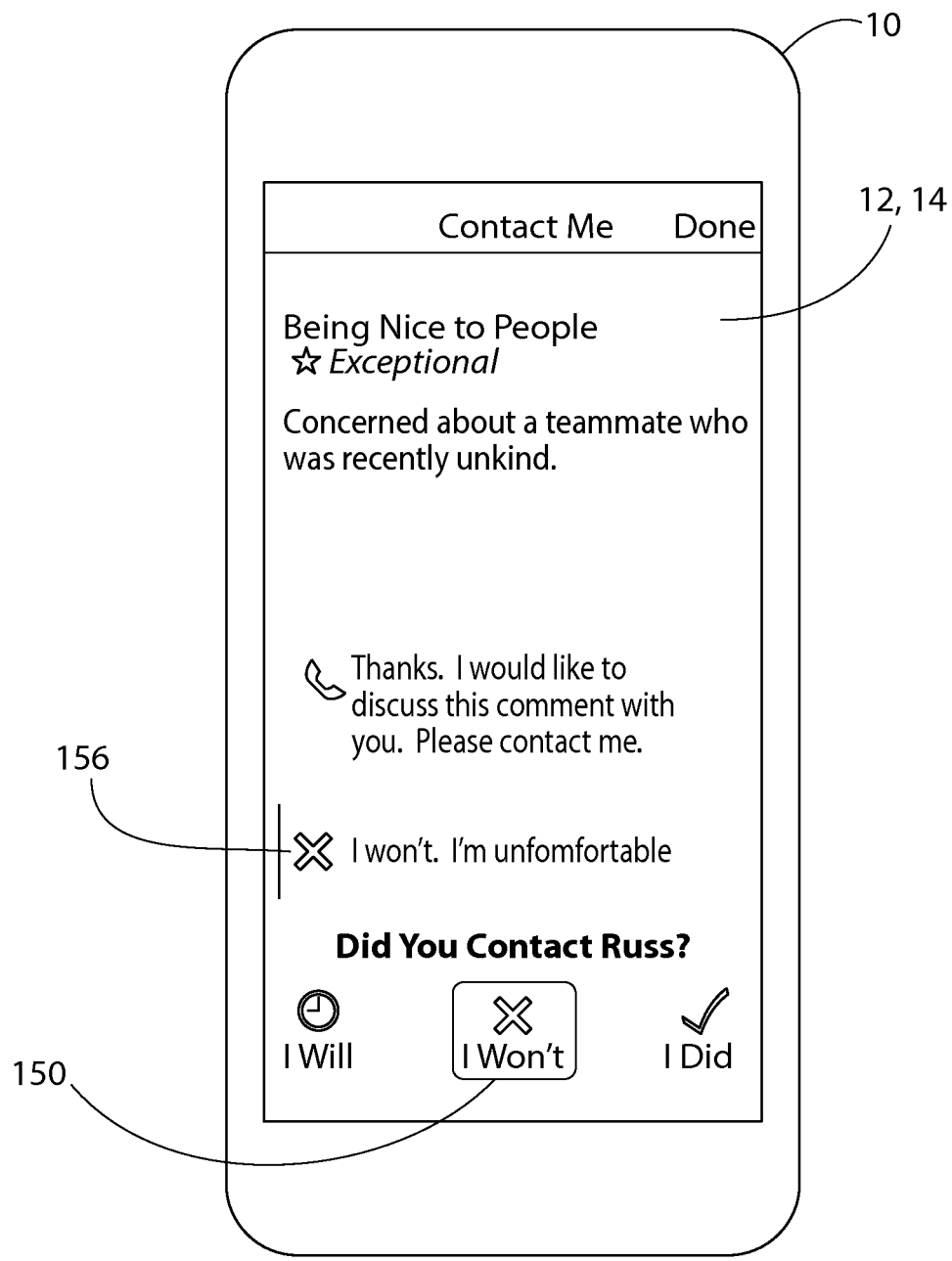
FIG. 11 is an image of an employee user interface showing an employee status change after declining a contact-me request according to one embodiment of the present invention.

FIG. 11 is an image of an employee user interface 14 showing a change to an employee status 156 after declining a contact-me request according to one embodiment of the present invention. The employee 11 has selected the I Won't option 150, and accordingly this option 150 is shown as being selected. Further, the employee status 156 has been changed to reflect the selection of the I Won't option 150.

Figure 12:
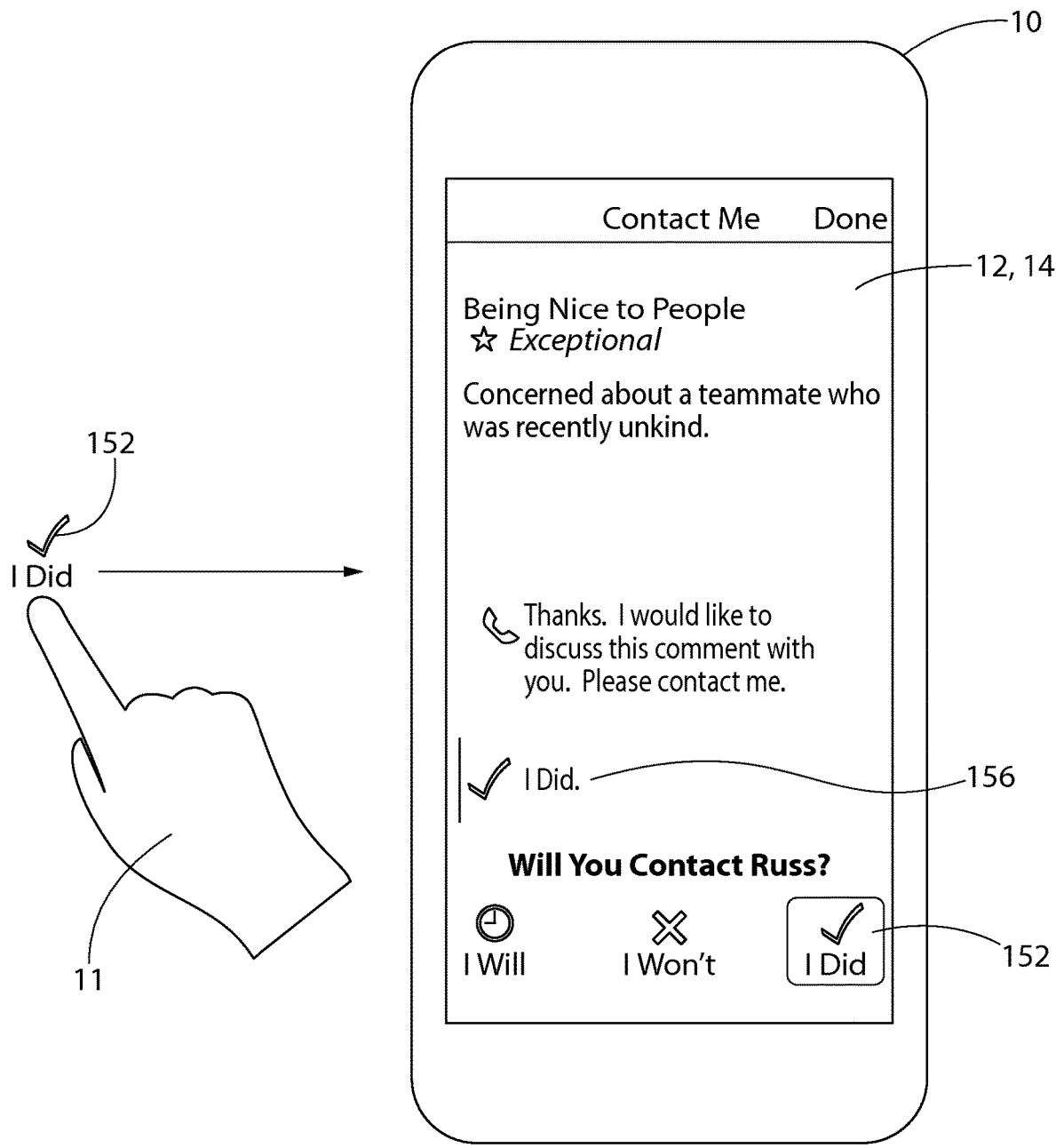
FIG. 12 is an image of an employee user interface showing an employee confirming response to a manager's contact-me request according to one embodiment of the present invention.

FIG. 12 is an image of an employee user interface 14 showing an employee 11 confirming response to a manager's contact-me request according to one embodiment of the present invention. The employee 11 has selected the I Did option 152, and accordingly this option 152 is shown as being selected. Further, the employee status 156 has been changed to reflect the selection of the I Did option 152.

Figure 13:
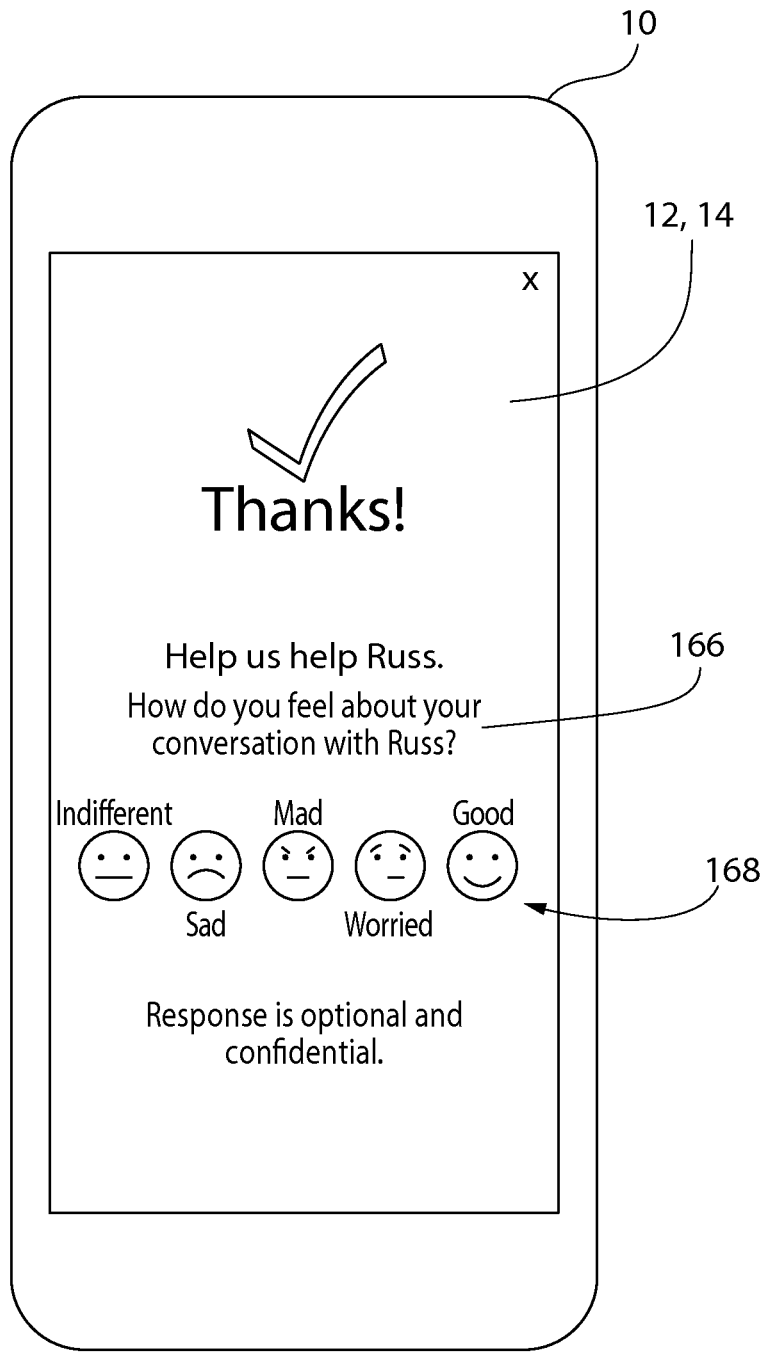
FIG. 13 is an image of an employee user interface showing a question regarding the employee's contact with the manager according to one embodiment of the present invention.

FIG. 13 is an image of an employee user interface 14 showing a question 166 regarding the employee's contact with the manager according to one embodiment of the present invention. After the employee 11 selects the I Did option 152, the employee user interface 14 thanks the employee 11 for contacting the manager 21 and asks a question 166 regarding how the conversation with the manager 21 went. The employee 11 is provided five options 168 to choose from: Indifferent, Sad, Mad, Worried, and Glad. In this embodiment, the response is optional and confidential. In other embodiments, other questions and/or options for response can be provided.

Figure 14:
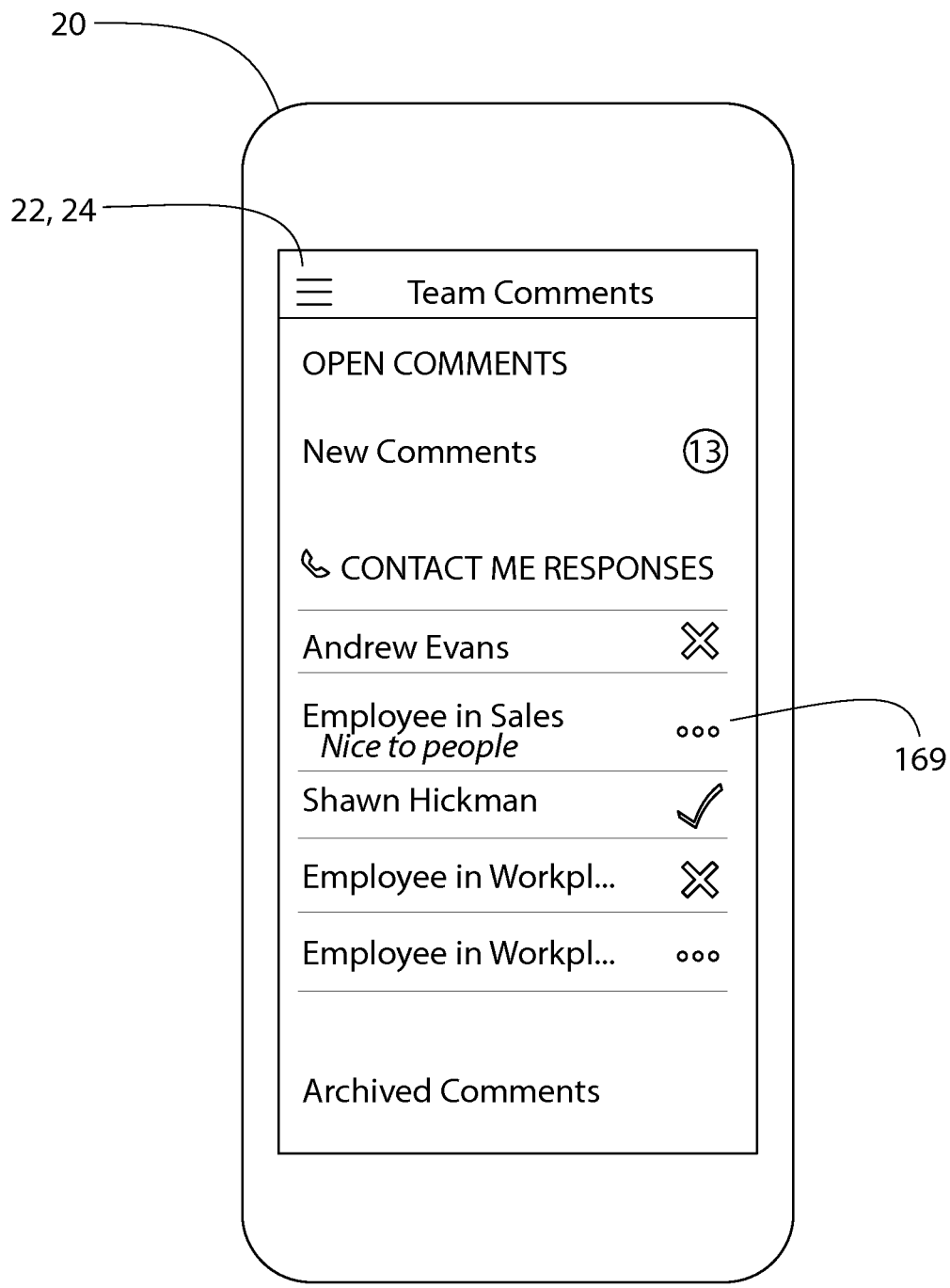
FIG. 14 is an image of a manager user interface showing contact-me employee responses according to one embodiment of the present invention.
Figure 15:
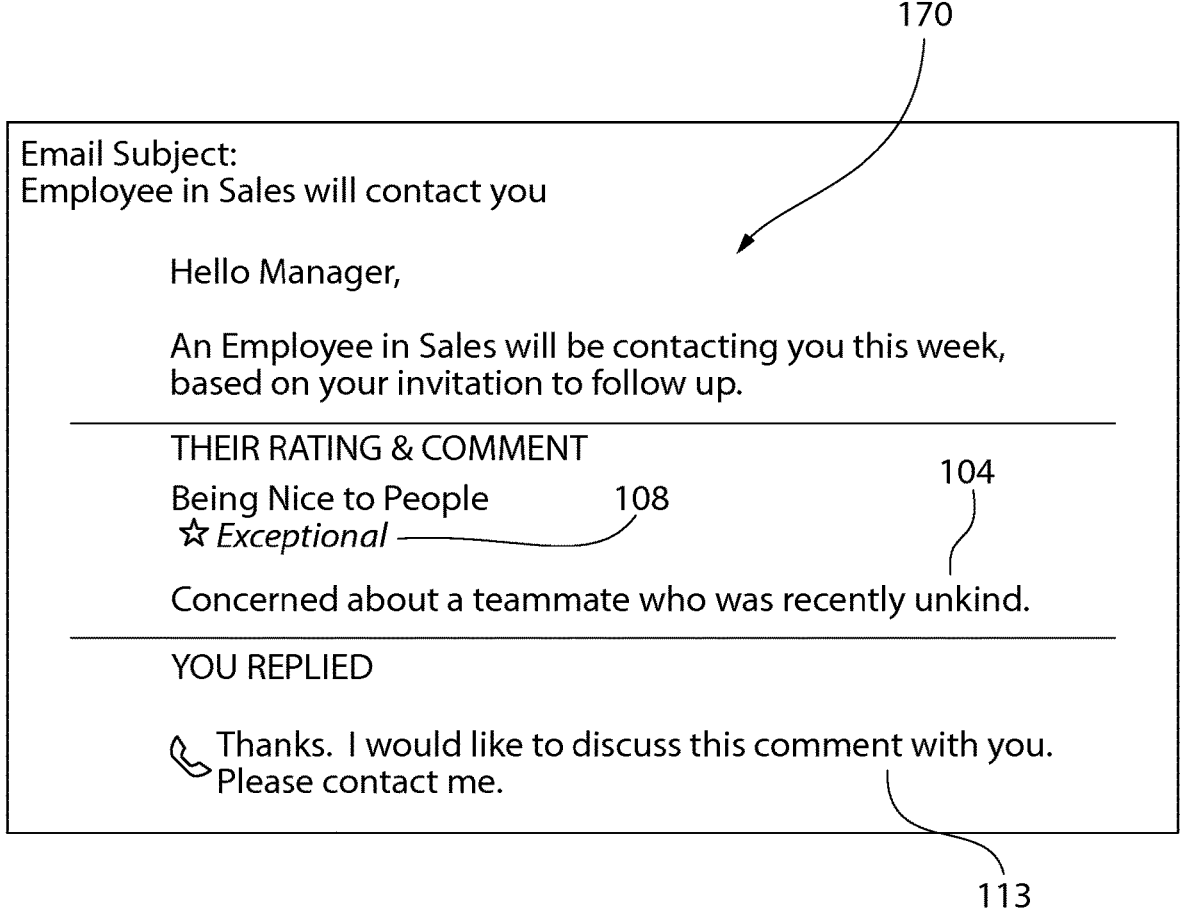
FIG. 15 is an image of an email to a manager regarding the status of a contact-me request according to one embodiment of the present invention.
Figure 16:
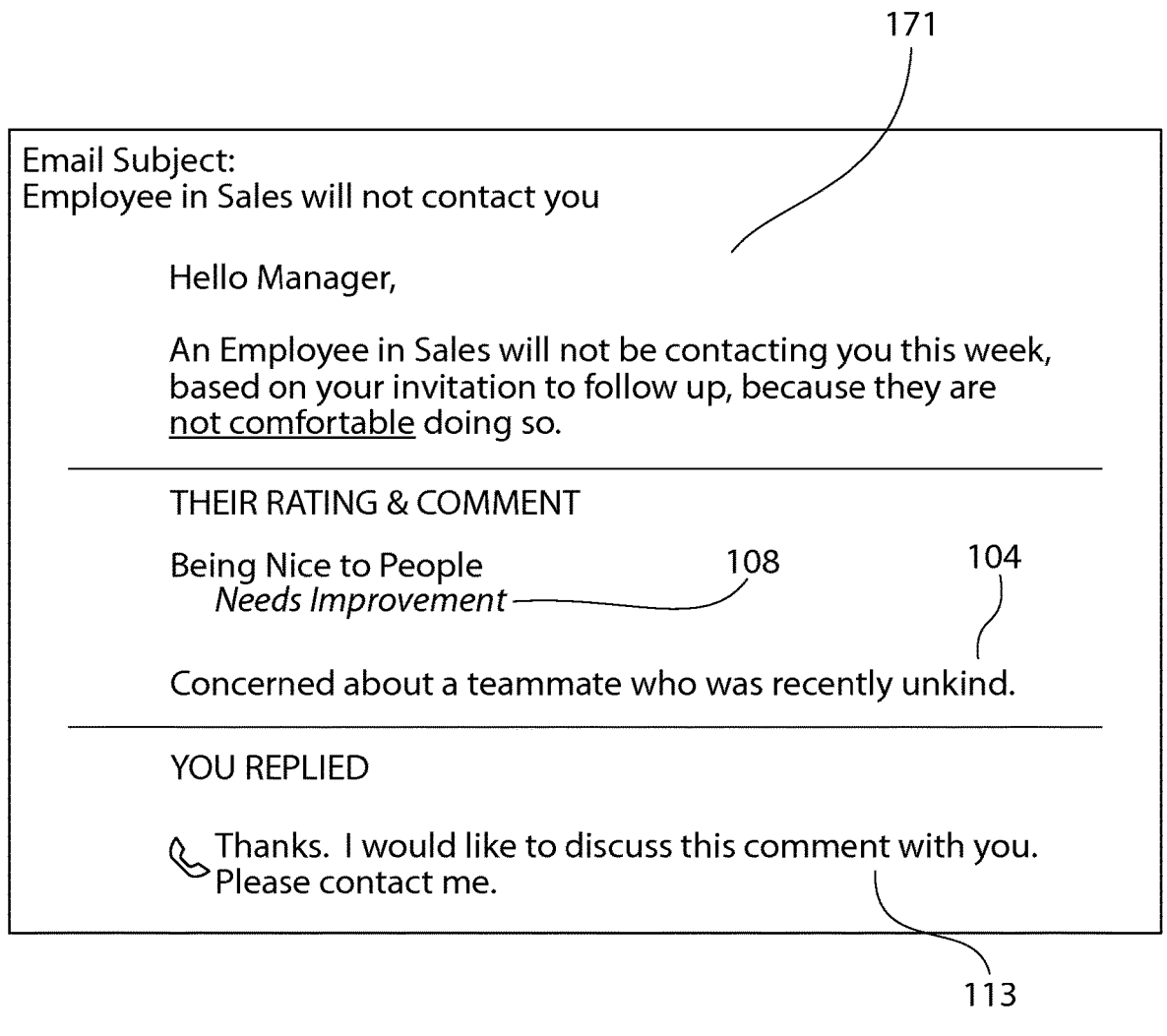
FIG. 16 is an image of another email to a manager regarding the status of a contact-me request according to an embodiment of the present invention.

FIGS. 14-16 are images showing the manager being notified of the employee comment 104 to the contact-me request 117 according to one embodiment of the present invention. FIG. 14 is an image of a manager user interface 24 showing contact-me employee comments 169 according to one embodiment of the present invention. The "Pending" response 169 indicates selection of the I Will option by the employee 11. At this interface 24, the manager 21 can select comments to view. Also, the manager 21 can see a list of the responses to contact-me requests 117, and select one for more details. Certain responses can show the employee name (those employees willing to forego their anonymity) while other responses can show less information, such as employee's department within the organization. For each response, the status of the contact me response will be shown. Statuses can include Did, Pending, and Won't.

FIG. 15 is an image of an email 170 to a manager 21 regarding the status of a contact-me request 117 according to one embodiment of the present invention. The system can send the manager this email 170 when the employee 11 responds to the contact-me request 117. In this example, the employee 11 indicated he will contact the manager 21 that week, and the language of the email reflects this status. The email 170 includes the response rating 108, the employee comment 104, and the manager response 113. In other embodiments, other information can be included.

FIG. 16 is an image of another email 171 to a manager 21 regarding the status of a contact-me request 117 according to an embodiment of the present invention. In this example, the employee 11 indicated he will not contact the manager 21 because he is not comfortable doing so, and the language of the email 171 reflects this status. The email 171 includes the response rating 108, the employee comment 104, and the manager response 113. In other embodiments, other information can be included.

It is noted that in other embodiments, the first instance of the survey application can provide an employee an ability to volunteer a comment that is not in response to a survey topic and therefore unsolicited. For example, an employee may desire to bring an issue to the attention of management that management is unaware of. The employee could do so using the first instance of the survey application, and the manager options discussed above for responding to an employee comment (and the options for the employee) could be made available for the unsolicited comment.

Figure 17:
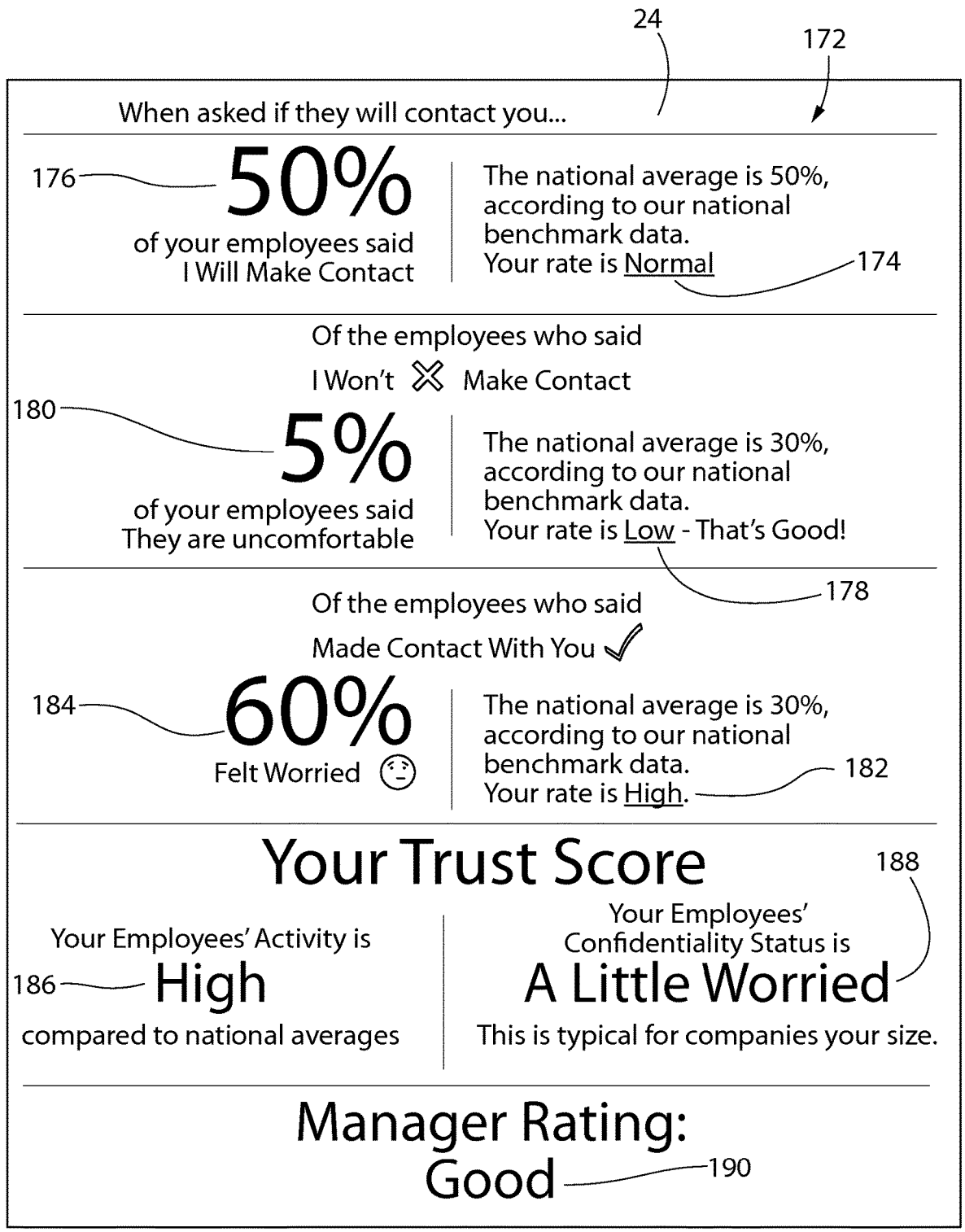
FIG. 17 is an image of a manager user interface providing a manager rating summary according to an embodiment of the present invention.

FIG. 17 is an image of a manager user interface 24 providing a manager rating summary 172 according to an embodiment of the present invention. The manager rating summary 172 summarizes the employee comments to the manager's contact-me requests. The email indicates that, when asked if they will contact this manager 21, what percentage 176 said they will make contact, and how that rate compares to the national average based on national benchmark data. Based on that information, a first manager rating 174 is provided. In this example, the first manager rating 174 is Normal, indicating that a normal percentage of employees receiving contact-me requests said they would make contact. This rating 174 can change (e.g., to Low or High) based on the percentage 176.

The manager rating summary 172 further indicates that, of those that declined to make contact, what percentage 180 of employees was uncomfortable, and how that compares to the national average based on national benchmark data. Benchmark data, as discussed herein, can include data based on other managers in the organization, or data for other managers at similar organizations. Based on the percentage 180, a second manager rating 178 is provided. In this example, the second manager rating 178 is Low, indicating few employees were uncomfortable making contact with the employer. This rating 178 can change (e.g., to Normal or High) based on the percentage 180.

The manager rating summary 172 further indicates that, of those that made contact, what percentage 184 felt worried, and how that compares to the national average based on national benchmark data. Based on that information, a third manager rating 182 is provided. In this example, the third manager rating 182 is High, indicating that many employees are worried about their contact with the employer. This rating 182 can change (e.g., to Low or Normal) based on the percentage 184.

The manager user interface 24 further provides trust scores related employee activity and employee confidentiality status—specifically, an employee activity rating 186 and an employee confidentiality status rating 188. The employee activity rating 186 indicates how frequently and well employees are using the system. Employees that do not believe their participation in the system will make a difference will tend to be less active, and therefore activity is indicative of how effective managers are being and how engaged employees are. Potential employee activity ratings 186 include Exceptional, High, Medium, and Low.

The employee confidentiality status rating 188 is based on the default confidentiality levels chosen by the manager's employees. In the exemplified embodiment, each employee can choose a default confidentiality level. Non-limiting examples of chosen default confidentiality levels are Fearless, A Little Worried, and Scared. The level chosen will help control the amount of confidentiality provided to an employee when an employee submits a comment. For example, when an employee submits a comment, the employee can be identified by the employee's name, as an employee of a certain department, as an employee of a larger department, or simply as an employee of the company, depending on the level of confidentiality desired. The employee confidentiality status rating 188 can be indicative of how worried employees are about providing feedback.

Further, the rating summary 172 can include a composite manager rating 190 based on one or more of the factors discussed herein. In the exemplified embodiment, the composite manager rating 190 is Good. Other options, such as Poor, Average, and Excellent, can be available. The manager rating can be any classification or ranking.

A manager rating can be based on various other factors or combinations of factors. For example, as discussed with regard to FIG. 10, when an employee indicates an unwillingness to contact the manager, the employee is prompted to indicate why and is given options, the options including an option critical of the manager. A manager rating can be based on a number or percentage of the employees selecting an option critical of the manager.

Further, as discussed with regard to FIG. 13, employees indicating contact with the manager can be provided a question regarding the employees' experience in contacting the manager. The manager rating can be based on answers to the question regarding the employees' experience in contacting the manager.

Further, the manager rating can be based on the percentage of employee comments the manager responds to within a given time period, a percentage of the manager's total employees that have provided a predetermined number of responses to survey topics, and/or the number of survey questions the manager asks.

Figure 18:
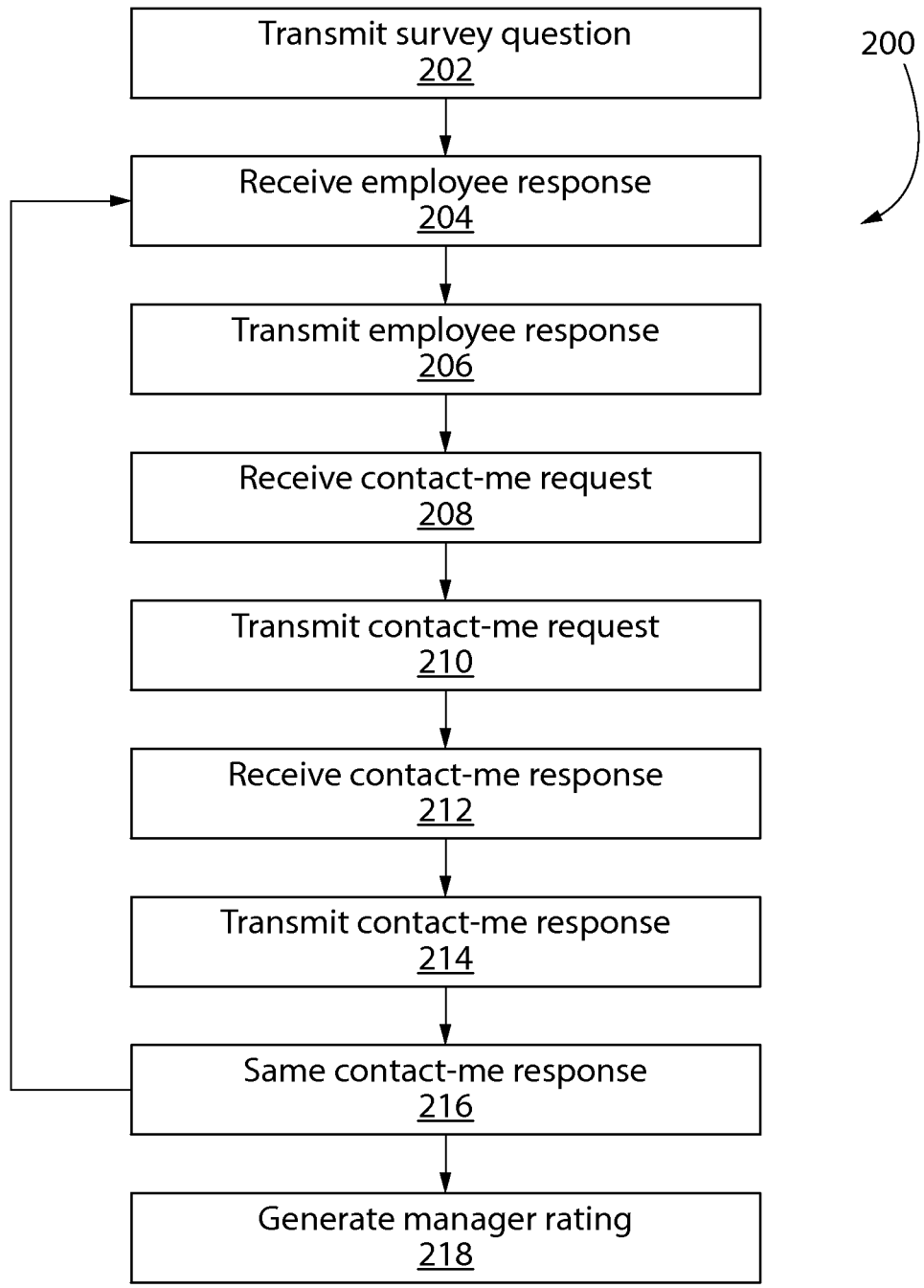
FIG. 18 is a flowchart for a method of manager-employee communication and generating a manager rating according to an embodiment of the present invention.

FIG. 18 is a flowchart for a method 200 of manager-employee communication and generating a manager rating according to an embodiment of the present invention. In the exemplified embodiment, on an employee device of an employee of an organization, a first instance of a survey application is executed. Further, on a manager device of a manager of the organization, a second instance of a survey application is executed. The exemplified method then carries out the following steps: transmitting survey topic data to the employee device to enable a user interface of the first instance of the survey application to display a survey topic (step 202); receiving real-time first response data from the employee device indicating an employee comment to the survey topic (step 204); transmitting second response data to the manager device to enable a user interface of the second instance of the survey application to display in real time the employee comment to the survey topic without identifying the employee (step 206); receiving contact-me data from the manager device indicating a contact-me request, the contact-me request indicating that the manager desires the employee to contact the manager directly regarding the employee comment to the survey topic (step 208); transmitting second contact-me data to the employee device in real-time to enable the user interface of the first instance of the survey application to display the contact-me request (step 210); receiving first contact-me response data from the employee device indicating in real time whether the employee will or did contact the manager directly (step 212); transmitting second contact-me response data to the manager device to enable the user interface of the second instance of the survey application to display whether the employee will or did contact the manager directly without identifying the employee (step 214); saving the contact-me response (step 216); repeating these steps for additional employee comments; and generating a manager rating based on the saved contact-me response data (step 218). As used herein, real time is understood to mean immediately or substantially immediately (e.g., within seconds). In other embodiments, the method can use less rapid communications.

In other embodiments, the contact me response data can indicate whether the employee did contact the manager directly, as opposed to or in addition to indicating whether the employee will contact the manager. Further, the manager rating can be based on composite contact-me data, the composite contact-me data being data indicating whether each of the relevant employees will or did contact the manager directly. Further, in other embodiments, the repeating of the steps 204 to 216 for additional employees can be omitted, and the method can facilitate communication between a manager and only one employee. Further, in certain embodiments, the generation of a manager rating can be omitted.

The invention provides several advantages. For example, the system allows a manager to provide a survey question or topic to employees in real-time. Further, the system allows the employee to send a comment or response in real-time and, in certain embodiments, the comment can be sent from the convenience of a mobile device. Further, the manager can conveniently (and in real-time) respond to the comment in a variety of ways, including thanking the employee and/or marking the comment as exceptional (making the employee feel appreciated for his comment), asking for clarification (to ensure more thorough and accurate information), asking the employee to contact the manager (to obtain additional valuable information), informing another manager of the comment (to share information), reviewing the responses of other managers (to ensure consistency in response), indicating the manager will take action (to notify other managers), delegating the comment (to ensure someone else handles the comment), and sharing the comment in a monthly report (to conveniently ensure the comment is brought to the attention of a larger audience). Further, the employee can have his anonymity preserved and decline to respond to the contact-me request, and can indicate why. The employee also has the option to indicate a willingness to talk to the manager. Further, the manager can conveniently receive information on the status of his contact-me requests, and can receive reports summarizing contact-me results. Such options provide for a convenient real-time system in which managers can receive survey responses and follow-up with the employee in real-time while enabling the employee to maintain anonymity and the manager to be rated based on these communications.

While the invention been described with respect to specific examples, those skilled in the art will appreciate that there are numerous variations and permutations of the above described invention. It is to be understood that other embodiments may be utilized and structural and functional modifications may be made without departing from the scope of the present invention. Thus, the spirit and scope should be construed broadly as set forth in the appended claims.

What is claimed is:

1. A method comprising:

receiving, at a server, comment data from employee devices of employees of an organization, the comment data entered via a graphical user interface of each employee device using a survey application running on the employee devices, the comment data indicating employee comments to a survey topic provided by the survey application;

receiving from each employee, via each of the graphical user interfaces of the employee devices, a selection of a level of confidentiality desired from among a plurality of confidentiality level options, the plurality of confidentiality level options including a first level that prevents identification of the employee;

transmitting, by the server, the employee comments to a graphical user interface of a manager device of a manager of the employee, each of the employee comments being accompanied by a description of the employee, wherein a specificity of the description of the employee is based on the selected level of confidentiality for the employee, and wherein employees selecting the first level are not identified by name;

receiving, at the server, contact-me data from the manager device indicating contact-me requests, the contact-me requests indicating that the manager desires the unidentified employees that selected the first level of confidentiality to contact the manager directly regarding the employee comments to the survey topic;

transmitting, by the server, the contact-me requests to the graphical user interfaces of the employee devices of the unidentified employees that selected the first level of confidentiality by the survey application;

receiving, at the server, contact-me response data from the employee devices of the unidentified employees that selected the first level of confidentiality, the contact-me response data entered via the graphical user interfaces of the employee devices using the survey application, the contact-me response data indicating whether the unidentified employees will contact the manager directly;

determining, at the server, from the contact-me response data, a percentage of the unidentified employees that selected the first level of confidentiality that indicated they would contact the manager directly; and transmitting, by the server, a manager rating to the graphical user interface of the manager device, the manager rating based on the determined percentage of the unidentified employees that selected the first level of confidentiality that indicated they would contact the manager directly.

2. The method of claim 1 wherein the manager rating is further based on benchmark data.

3. The method of claim 2 wherein the benchmark data is based on data for other managers in the organization, or data for other managers at similar organizations.

4. The method of claim 1 wherein:
when an employee indicates an unwillingness to contact the manager, the employee is prompted to indicate why and is given options, the options including an option critical of the manager; and
the manager rating is further based on a percentage of the employees selecting an option critical of the manager.

5. The method of claim 1 wherein:
employees indicating contact with the manager are provided a question regarding the employees' experience in contacting the manager; and
the manager rating is further based on answers to the question regarding the employees' experience in contacting the manager.

6. The method of claim 1 wherein the manager rating is further based on the percentage of employee comments the manager responds to within a given time period.

7. The method of claim 1 wherein the manager rating is further based on a percentage of the manager's total employees that have provided a predetermined number of responses to survey topics.

8. The method of claim 1 wherein the manager rating is further based on the number of survey topics the manager asks.

9. A system comprising:
employee devices of employees of an organization running a survey application;
a manager device of a manager of the employees of the organization; and
a server configured to:
receive comment data from the employee devices, the comment data entered via a graphical user interface of each employee device using the survey application, the comment data indicating employee comments to a survey topic provided by the survey application;
receive from each employee, via each of the graphical user interfaces of the employee devices, a selection of a level of confidentiality desired from among a plurality of confidentiality level options, the plurality of confidentiality level options including a first level that prevents identification of the employee;
transmit the employee comments to a graphical user interface of the manager device, each of the employee comments being accompanied by a description of the employee, wherein a specificity of the description of the employee is based on the selected level of confidentiality for the employee, and wherein employees selecting the first level are not identified by name;
receive contact-me data from the manager device indicating contact-me requests, the contact-me requests indicating that the manager desires the unidentified employees that selected the first level of confidentiality to contact the manager directly regarding the employee comments to the survey topic;
transmit the contact-me requests to the graphical user interfaces of the employee devices of the unidentified employees that selected the first level of confidentiality;
receive contact-me response data from the employee devices of the unidentified employees that selected the first level of confidentiality, the contact-me response data entered via the graphical user interfaces of the employee devices using the survey application, the contact-me response data indicating whether the unidentified employees will contact the manager directly
determine, from the contact-me response data, a percentage of the unidentified employees that selected the first level of confidentiality that indicated they would contact the manager directly; and
transmit a manager rating the graphical user interface of based on the determined percentage of the unidentified employees that selected the first level of confidentiality that indicated they would contact the manager directly.

10. The system of claim 9 wherein the manager rating is further based on benchmark data.

11. The system of claim 10 wherein the benchmark data is based on data for other managers in the organization, or data for other managers at similar organizations.

12. The system of claim 9 wherein:
when an employee indicates an unwillingness to contact the manager, the employee is prompted to indicate why and is given options, the options including an option critical of the manager; and
the manager rating is further based on a percentage of the employees selecting an option critical of the manager.

13. The system of claim 9 wherein:
employees indicating contact with the manager are provided a question regarding the employees' experience in contacting the manager; and
the manager rating is further based on answers to the question regarding the employees' experience in contacting the manager.

* * * * *